US012630094B2

(12) United States Patent
McFadden et al.

(10) Patent No.: US 12,630,094 B2
(45) Date of Patent: May 19, 2026

(54) VEHICLE ROOF TRACK SUPPORT STRUCTURES

(71) Applicant: Yakima Products, Inc., Lake Oswego, OR (US)

(72) Inventors: Scott A. McFadden, Portland, OR (US); Jacquelyn Sue Ogle, Portland, OR (US); Taylor Richard Hill, Sherwood, OR (US); David Condon, Beaverton, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 173 days.

(21) Appl. No.: 18/523,775

(22) Filed: Nov. 29, 2023

(65) Prior Publication Data

US 2024/0174182 A1 May 30, 2024

Related U.S. Application Data

(60) Provisional application No. 63/429,084, filed on Nov. 30, 2022.

(51) Int. Cl.
B60R 9/045 (2006.01)
(52) U.S. Cl.
CPC ..................................... B60R 9/045 (2013.01)
(58) Field of Classification Search
CPC .................................. B60R 9/04; B60R 9/045
USPC ......................................................... 224/321
See application file for complete search history.

(56) References Cited

U.S. PATENT DOCUMENTS

| | | | | |
|---|---|---|---|---|
| 4,538,752 A | * | 9/1985 | Welter | B60R 9/08 296/37.7 |
| 5,292,045 A | | 3/1994 | Mandel | |
| 6,152,339 A | * | 11/2000 | Kreisler | B60R 9/00 224/310 |
| D434,718 S | * | 12/2000 | Kreisler | D12/412 |
| 6,427,888 B1 | * | 8/2002 | Condon | B60R 9/042 224/310 |
| 9,187,046 B2 | * | 11/2015 | Peck | B60R 9/04 |
| 10,717,392 B2 | | 7/2020 | Engelke | |
| 11,225,129 B2 | * | 1/2022 | Stojkovic | B60J 7/11 |
| 12,304,291 B2 | * | 5/2025 | Schafer, Jr. | B60R 9/058 |
| 2014/0069971 A1 | | 3/2014 | van Kaathoven | |
| 2021/0394684 A1 | | 12/2021 | Cropley et al. | |

FOREIGN PATENT DOCUMENTS

| | | |
|---|---|---|
| AU | 2019370616 A1 | 5/2020 |
| CA | 3117908 A1 | 5/2020 |
| WO | 2020087108 A1 | 5/2020 |

* cited by examiner

*Primary Examiner* — Peter N Helvey
(74) *Attorney, Agent, or Firm* — Kolisch Hartwell, P.C.

(57) ABSTRACT

A support structure for a roof track on a vehicle, including a rear bracket. The rear bracket includes a roof rail configured to contact an interior side of a vehicle roof, a bar foot configured to engage a safety bar, and a support member extending between the roof rail and the bar foot. The roof rail and the bar foot are each pivotably and rotatably connected to the support member.

20 Claims, 15 Drawing Sheets

200

206

210

212

206

210

212

VEHICLE ROOF TRACK SUPPORT STRUCTURES

CROSS-REFERENCES

This application claims the benefit under 35 U.S.C. § 119(e) of the priority of U.S. Provisional Patent Application Ser. No. 63/429,084, filed Nov. 30, 2022, the entirety of which is hereby incorporated by reference for all purposes.

BACKGROUND

The growing popularity of outdoor recreational activities has increased demand for racks to carry a variety of recreational equipment in and on vehicles. Roof racks are a popular and convenient way to transport supplies and equipment, and removable-roof vehicles such as Jeeps are popular vehicles for outdoor recreation.

However, most roof racks are designed to attach to tracks or rails built into the roof of a vehicle, and are not compatible with soft-top style removable roofs. Even hard-top style removable roofs do not include tracks or rails, and are constructed in a manner that is unsuitable to support roof racks carrying heavy loads.

An effective roof rack mounting point and support structure for removable-roof vehicles is desirable, which accommodates heavy loads safely and allows flexibility in choice of rack type, but has minimal weight and does not require complicated removal and replacement routines between uses.

SUMMARY

The present disclosure provides systems, apparatus, and methods relating to vehicle roof track support structures. In some examples, a vehicle roof track support structure may include a rear bracket having a roof rail, a bar foot, and a support member extending between the roof rail and the bar foot. The roof rail may be configured to contact an interior side of a vehicle roof, and the bar foot may be configured to engage a safety bar. The roof rail and the bar foot may each be pivotably and rotatably connected to the support member.

In some examples, a vehicle roof track system may include a track having a T-slot, a front bracket, and a rear bracket. Each of the front bracket and the rear bracket may include a roof rail, a bar foot, and a support member connecting the roof rail to the bar foot. The roof rail may be configured to contact an interior side of a vehicle roof, and the bar foot may be configured to engage a safety bar. The track may be fastened to the roof rail of each bracket. The support member of the rear bracket may be pivotably connected to the roof rail and the bar foot of the rear bracket.

In some examples, a vehicle may include a roof structure, a safety bar assembly inside the vehicle, and two tracks mounted to the roof structure. Each track may be supported by a pair of brackets inside the vehicle. Each bracket may include a roof rail fastened to one of the two tracks through the roof structure, and a bar foot engaging the safety bar assembly. The rear bracket of each pair of brackets may include a support member, the roof rail and the bar foot of the rear bracket each being pivotably connected to the support member.

Features, functions, and advantages may be achieved independently in various examples of the present disclosure, or may be combined in yet other examples, further details of which can be seen with reference to the following description and drawings.

DETAILED DESCRIPTION

Figure 1:
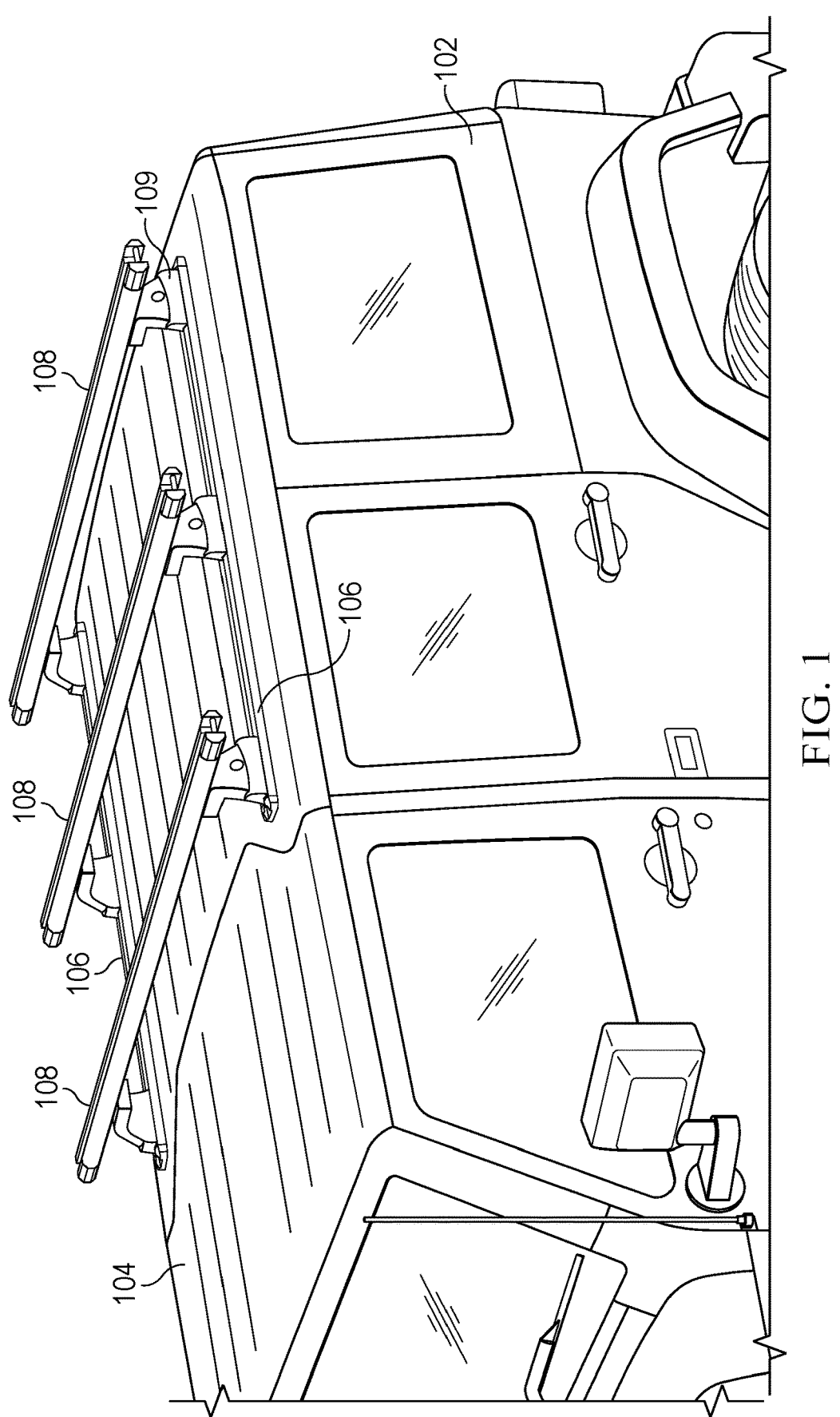
FIG. 1 is an isometric view of a vehicle with an illustrative roof rack in accordance with aspects of the present disclosure.

Various aspects and examples of a vehicle roof track support structure configured for mounting to sport bars or roll bars, as well as related components, systems, and methods, are described below and illustrated in the associated drawings. Unless otherwise specified, a roof track support structure in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Definitions; (2) Overview; (3) Examples, Components, and Alternatives; (4)

Illustrative Combinations and Additional Examples; and (5) Conclusion. The Examples, Components, and Alternatives section is further divided into subsections A and B, each of which is labeled accordingly.

Definitions

The following definitions apply herein, unless otherwise indicated. Additionally, as used herein, like numerals refer to like parts.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of the specified value, insofar as such variations are appropriate to perform in the disclosure. It is to be understood that the value to which the modifier "approximately" refers is itself also specifically, and preferably, disclosed.

A removable roof vehicle as described herein may be understood to encompass convertible or cabriolet vehicles of both soft-top and hard-top convertible roof types, or any vehicle which can be driven with or without a roof in place. A hard-top roof may include both retractable hardtops and detachable hardtops, of any rigid material including but not limited to metal or plastic.

A "safety bar" or "safety bar assembly" as described herein may be understood to encompass sport bars, roll bars, roll cages, and/or any rigid bars installed in or on a vehicle to protect occupants during a roll over or other type of vehicular accident.

Overview

In general, a vehicle roof track system may include a support structure and a pair of tracks. The support structure may include two pairs of brackets, each pair having a front bracket and a rear bracket. Each pair of brackets may correspond to one of the two tracks, each track being mounted to the corresponding pair of brackets through the roof of the vehicle. Each bracket may be configured for mounting to a safety bar assembly of a vehicle, inside the vehicle. The front and/or rear brackets may be adjustable in one or more dimensions.

The roof track system may be described as including two separate and independent assemblies, each having a pair of brackets and a track. The independent assemblies may be connected only indirectly, through mounting to the safety bar assembly and roof of the vehicle.

The tracks may also be described as elongate members or structural beams. In some examples, the tracks may include slots, apertures, fasteners, or other features configured for attachment of other rack components or accessories. For instance, each track may have two attachment points for crossbar towers. In some examples, the tracks may be interchangeable with and/or replaced by other roof rack structures such as crossbar towers or load platform feet. In such examples, each rack structure may connect to one, two, or all four brackets of the support structure.

The tracks may each include a T-slot for accessorizing; allowing mounting of a variety of crossbars, baskets, platforms, and other general purpose cargo accessories or more specific rooftop accessories such as rooftop tents or boat cradles.

The brackets may also be described as towers, feet, and/or supports. Each bracket may include an upper member configured to contact an underside of the roof, and a lower member configured to contact a bar of the safety bar assembly. The upper member may be connected to the lower member by one or more support members. The upper, lower, and support members may comprise a single monolithic element, or may include two or more connected components. In some examples, the upper member and the lower member of a bracket may have an adjustable relative separation in a vertical and/or horizontal direction, and/or elements of the bracket may be rotatable. Such adjustability may simplify installation and facilitate use on a range of vehicles.

The upper member of each bracket may be fastened to one of the tracks, by a fastener assembly extending through the roof. The roof may be described as sandwiched between the upper member and the track. The track system may also include waterproofing features to prevent water intrusion through the fastener holes. The lower member of each bracket may be fastened to one or more existing apertures or features of a bar of the safety bar assembly. For example, the lower member may be fastened to a weld nut on the bar.

The vehicle may be any car, van, sport utility vehicle, or other type of vehicle which includes a roof structure enclosing a bar structure. The roof structure may be a hardtop, removable roof, traditional roof, or any other such type. However, the track system herein may be particularly useful for vehicle roofs insufficiently supported by a frame of the car to accommodate mounting of a roof rack, or a desired load capacity. The bar structure may include a safety bar assembly such as roll cage or combination of sport bars, and/or any structure of bars appropriately supported by the vehicle frame or chassis.

The vehicle roof track system may be adapted for a specific vehicle make, model, and/or year. Additionally and/or alternatively, the vehicle roof track system may be configured for customization and/or adjustment to fit a range of vehicles.

The illustrative systems described below in Examples A and B are designed for four-door Jeeps stretching from 2007-2021 model years. Each illustrative system is appropriate either for the JK or the JL line. The JK was produced from 2007 to 2018, and JL was produced beginning 2018. The JK and JL adapted mounting systems described below have some differences based on the differences in the vehicle lines. Both designs attach to the roll cage and provide a mounting surface that supports the track extrusion on the roof.

For roof track mounting systems including adjustable brackets, the following method of installation may be used. This method may take advantage of the degrees of freedom of the brackets to help ensure that the roof track extrusions are installed parallel to one another, and that the interior support pieces can connect to existing holes in the vehicle.

The method includes installing two front brackets to a safety bar assembly of a vehicle, using existing mounting points. The method next includes drilling only one hole on each of the left and right sides of the vehicle, through the roof from inside the vehicle, with reference to a specific hole in the front brackets. The method next includes pre-aligning a pair of tracks on top of the roof, according to the drilled holes, and setting the tracks parallel and square relative to one another using a measuring tool such as a tape measure.

The method next includes drilling all mounting holes needed for the front and rear brackets and any additional fastener assemblies, drilling down from the top of the vehicle and using the tracks as a position reference. Finally, the method includes adjusting a length and angle of two rear brackets to match the drilled holes in the roof and existing mounting points on the roll cage, and installing all remaining hardware of the roof track mounting system.

This procedure and the degrees of freedom of the brackets may allow more precise placement of items on the outside of the vehicle while still accommodating the inherent dimensional variation from one vehicle to the next, as well as the dimensional variation in the disclosed product ("production tolerance").

Roof track mounting systems as described herein may allow removal of a hardtop from a vehicle after installation of the mounting system. More specifically, a user may fully install and use the mounting system with the hardtop on the vehicle. The user may then disconnect the brackets from the safety bar assembly and remove both the mounting system and the hardtop from the vehicle, without needing to disconnect the brackets from the rooftop tracks or the system from the hardtop. This may facilitate seasonal removal of the vehicle roof, as well as advantageously keeping the sealed joints between the roof tracks, fiberglass roof, and interior supports undisturbed after installation.

Examples, Components, and Alternatives

The following sections describe selected aspects of exemplary vehicle roof track support structures and roof track mounting systems, as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Roof Track System

As shown in FIGS. 1-10, this section describes an illustrative vehicle roof track system 100. System 100 is an example of a vehicle roof track mounting system, as described above.

FIG. 1 depicts track system 100 installed on a Jeep vehicle 102, with a hard-top roof 104. The track system includes two tracks 106, which are visible exterior to roof 104 while the rest of the track system is interior to the vehicle and therefore not visible. A trio of crossbars 108 are mounted by towers 109 to tracks 106.

To transport recreational equipment or other cargo, a user may mount a bike carrier, cargo box, basket, or other accessory to crossbars 108. The user may also remove crossbars 108 and towers 109 to allow mounting of other accessories directly to tracks 106. When not in use, track system 100 may be left installed on vehicle 102 with minimal impact to aerodynamics or fuel efficiency. The track system may be lighter and lower-profile than other roll-cage mounted systems, with only tracks 106 remaining exterior to roof 104 when the system is not in use.

Figure 2:
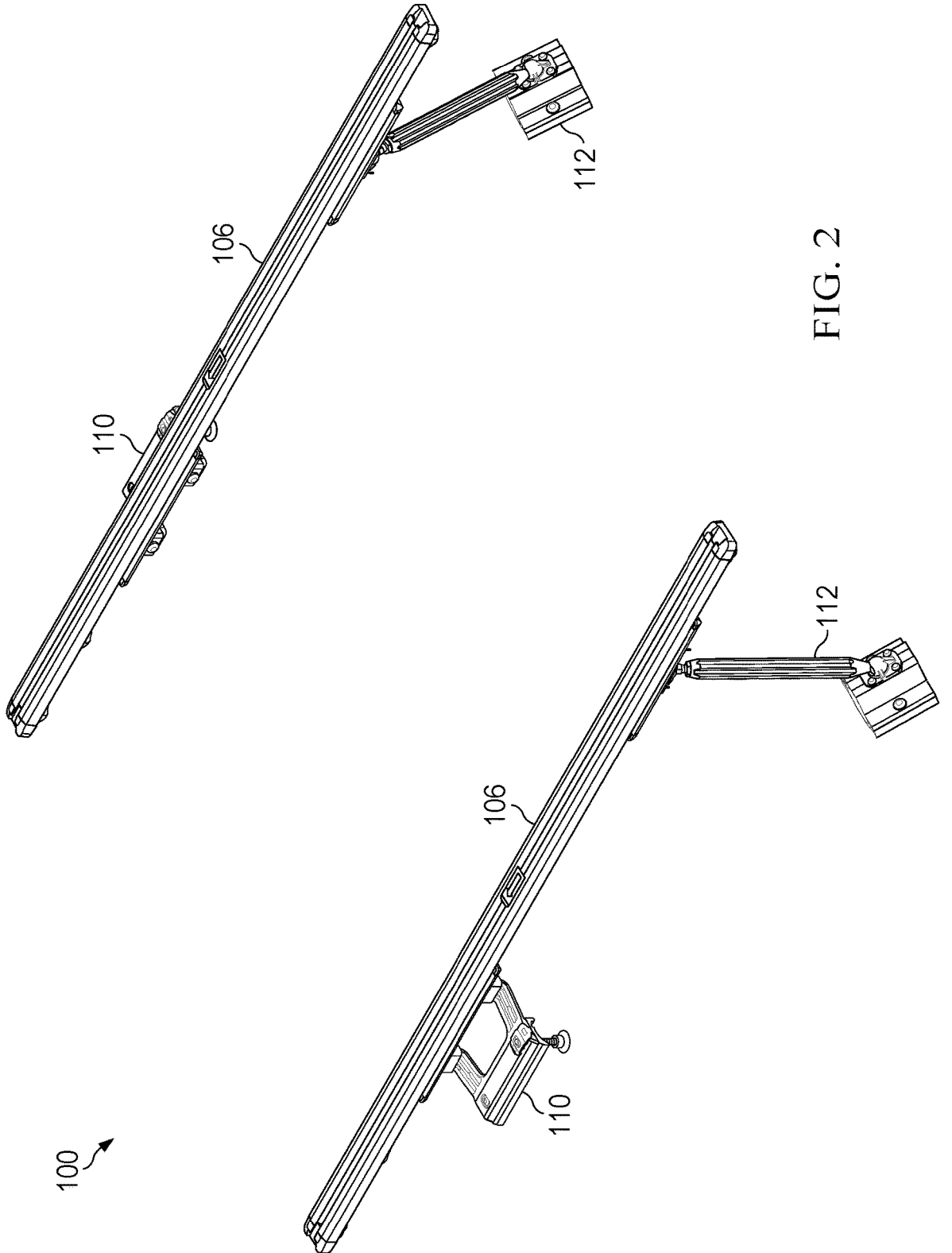
FIG. 2 is an isometric view of an illustrative vehicle roof track system.

Track system 100 can be seen separate from the vehicle in FIG. 2. The system includes two tracks 106, two front brackets 110, and two rear brackets 112. That is, each track 106 is mounted to a front bracket 110 and a rear bracket 112. Brackets 110 and 112 are an example of a vehicle roof track support structure, as described above.

Figure 3:
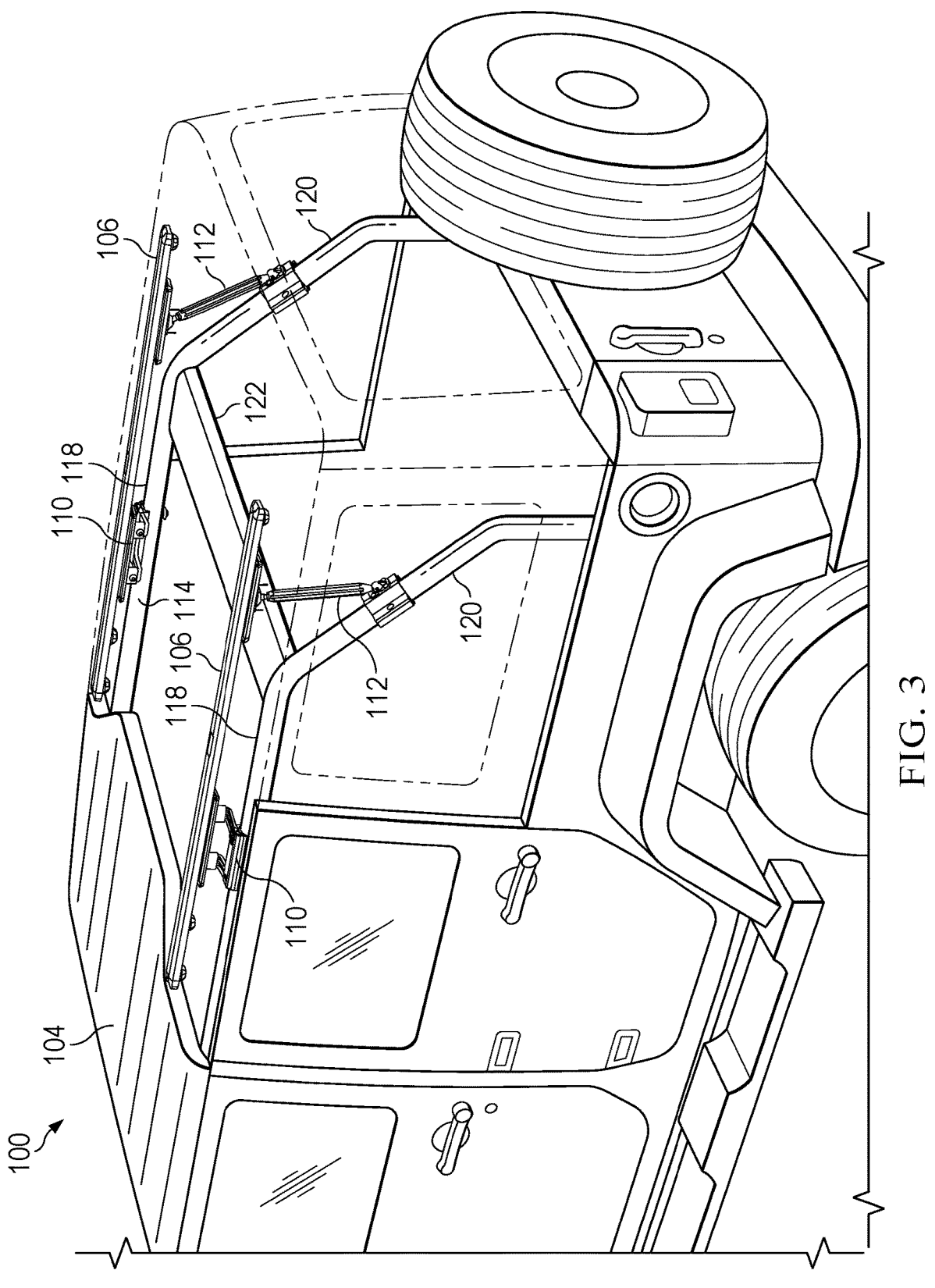
FIG. 3 is an isometric view of the roof track system of FIG. 2, installed on a safety bar assembly of a vehicle, with a portion of a roof of the vehicle depicted as semi-transparent.

In FIG. 3, track system 100 is shown mounted to a safety bar assembly 114 of the vehicle, with roof 104 depicted as partially transparent. This illustrative track system is configured for use with a Jeep JK 4-door, and in the present example safety bar assembly 114 is a roll cage. Roll cage 114 may be described as including two side hoops, connected by forward and rear cross-braces. Alternatively, the roll cage may be described as including left and right horizontal longitudinal bars 118, left and right sloping longitudinal bars 120, and a rear horizontal lateral bar 122. Horizontal bars 118 and sloping bars 120 are all cylindrical.

On the left side of the vehicle, one of tracks 106 is mounted by the corresponding front bracket 110 to the left-side horizontal longitudinal bar 118, and by the corresponding rear bracket 112 to the left-side sloping longitudinal bar 120. On the right side of the vehicle, the other of tracks 106 is similarly mounted by the corresponding front bracket 110 to the right-side horizontal longitudinal bar 118, and by the corresponding rear bracket 112 to the right-side sloping longitudinal bar 120. The front brackets 110 may be described as attaching to the horizontal longitudinal bars 118 at a location forward of rear horizontal lateral bar 122.

Tracks 106 are located exterior to the vehicle, on top of roof 104. A lower surface of each track contacts an upper exterior surface of the roof. Brackets 110, 112 are located interior to the vehicle, under roof 104. An upper surface of each bracket contacts a lower interior surface of the roof. Fasteners extend through the roof to fasten each track to the corresponding pair of brackets. Roof 104 may be described as sandwiched between the brackets and the tracks.

Figure 4:
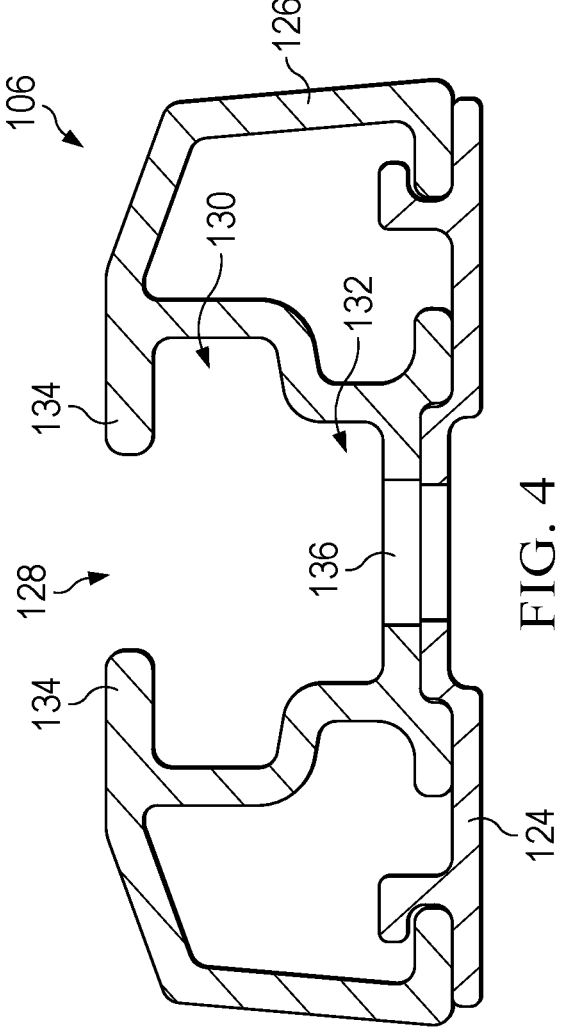
FIG. 4 is a cross-sectional view of one track of the roof track system of FIG. 2, taken perpendicular a longitudinal extent of the track.

FIG. 4 is a cross-sectional view of one of tracks 106. The other track may be understood to be substantially equivalent in structure. As shown, track 106 includes a base plate 124 and a body 126, which defines a T-slot. Tracks 106 may also be described as T-tracks, slot rails, or extruded channels. The base plate and body may be extruded aluminum or other similarly strong and light material. In some examples, the base plate may consist of or comprise a silicone or rubber material to aid in waterproofing. For example, a bottom surface of baseplate 124 may be a layer of silicone. In some examples, a separate layer of silicone or other waterproofing may be installed between base plate 124 and the roof.

In the present example, base plate 124 is connected to body 126 by interlocking structures, which may be slid into engagement and secured in position by endcaps. In some examples, the track may be a single piece or may include multiple components bonded or fastened together.

The T-slot of track 106 includes a restricted upper opening 128, a main channel 130 and a narrower lower channel 132. Opening 128 is defined between two lips or protrusions 134 of body 126. A plurality of apertures 136 extend vertically through body 126 and base plate 124 of track 106. Apertures 136 may be described as extending through a floor of track 106 and/or the T-slot. The apertures may be positioned to correspond with apertures of the brackets, allowing the track to be fastened to the brackets through the aligned apertures.

In some examples, track 106 may also be directly fastened to the roof. In such examples, the track may include additional apertures to accommodate associated fastener assemblies. The assemblies may be independent of front bracket 110 and rear bracket 112. For example, a square nut may be received in lower channel 132 over an aperture. A bolt may extend from the interior of the vehicle through the roof to engage the nut. Inside the vehicle, a head of the bolt may be received in a knob grip. The knob grip may allow manual tightening of the bolt into the nut, while the nut is prevented from rotating by engagement with lower channel 132. The knob grip may also have a planar upper surface configured to engage the roof. Any appropriate number of fastener assemblies may be positioned along track 106, to secure the track in addition to the front and rear brackets.

Connection features of accessories installed on track 106 may extend into main channel 130 and engage protrusions 134. Some elements of fastener assemblies extending through apertures 136 may be disposed in lower channel 132. For example, washers and bolt heads may be contained in lower channel 132 and thereby remain clear of main channel 130, preventing interference with accessory connectors.

Figure 5:
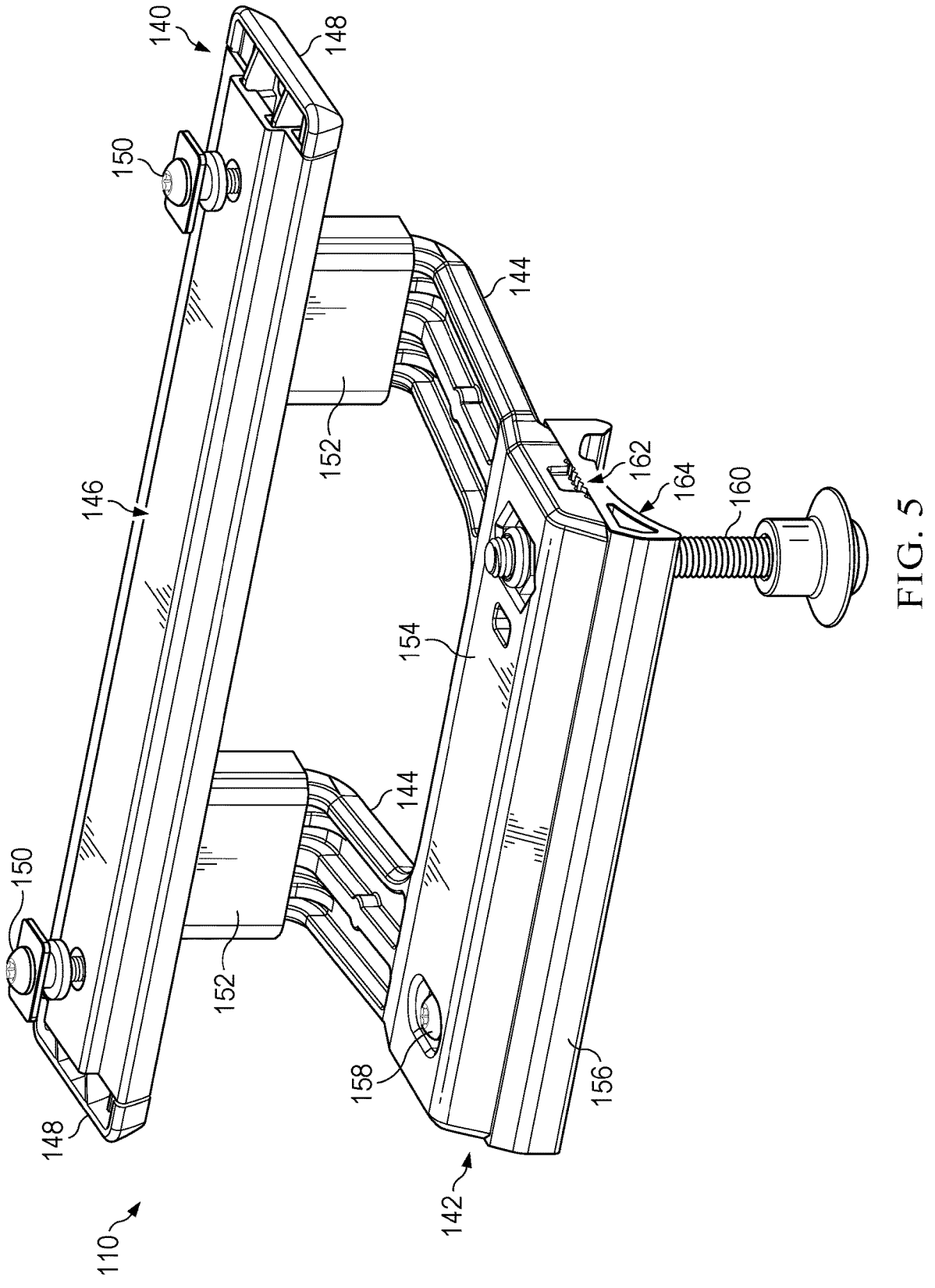
FIG. 5 is an isometric view of a front left bracket of the roof track system of FIG. 2.

FIG. 5 shows left-side front bracket 110 in isolation. The right-side front bracket shown in FIG. 3 may be understood to be substantially structurally equivalent, but mirror image. The following description may therefore apply to both front brackets.

Figure 6:
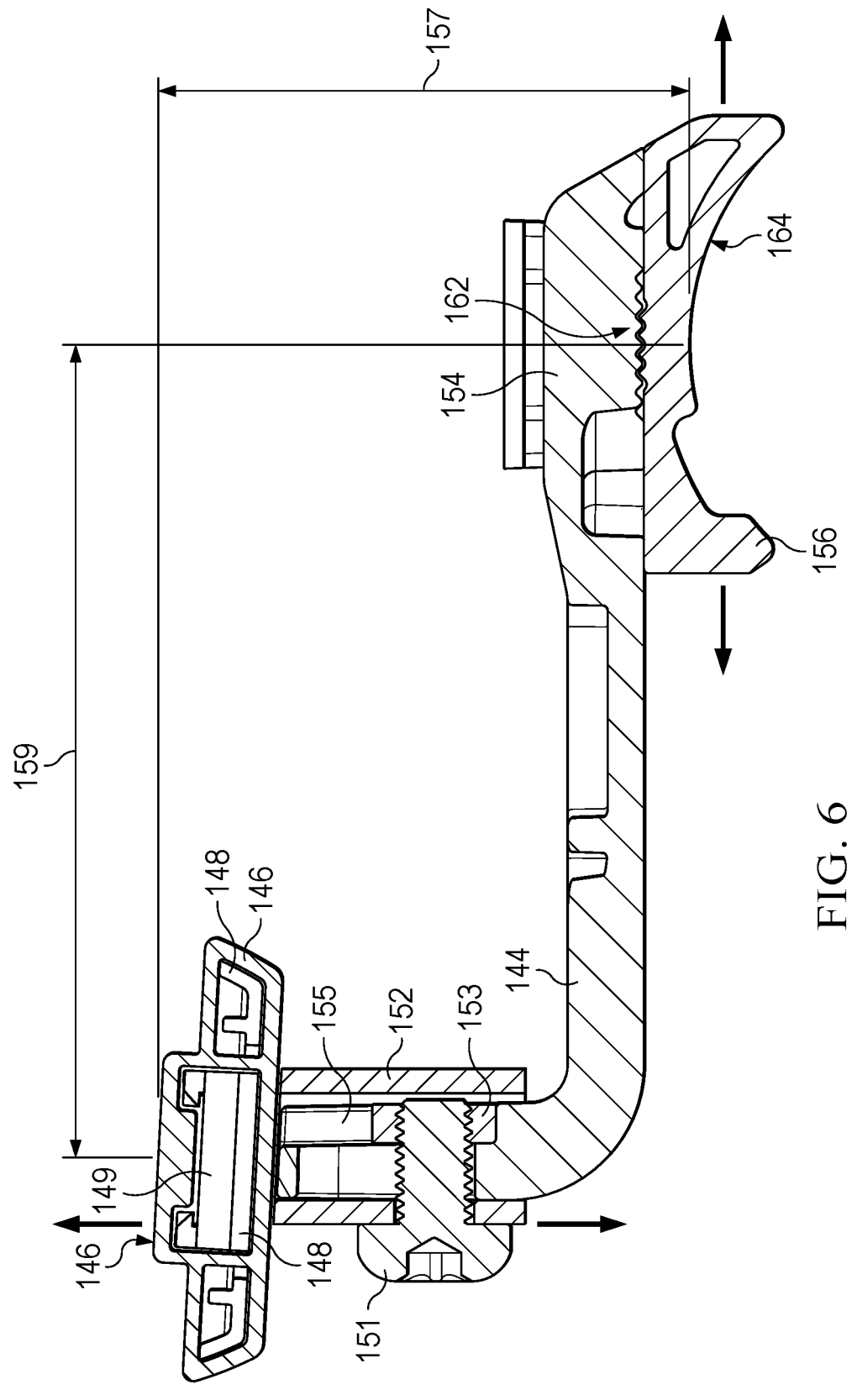
FIG. 6 is a cross-sectional view of the front left bracket of FIG. 5, taken perpendicular a longitudinal extent of the bracket.

Bracket 110 includes a roof rail 140 and a bar foot 142, connected by a pair of support members 144. Roof rail 140 has a top surface 146, configured to contact the underside of the roof. In the present example, top surface 146 has a raised planar central section and is configured to conform to a raised channel in a Jeep hard-top. As shown in FIG. 6, top surface 146 is slightly angled relative to support members 144 and bar foot 142, to accommodate a relative angle between the Jeep roof and the horizontal roll cage bars. In general, top surface 146 may have any shape, angle, or structure appropriate for effective contact with an inner surface of a vehicle roof.

When supporting a track, roof rail 140 is parallel to, and aligned with, the track. Roof rail 140 has an endcap 148 at each of a first end and a second end, as shown in FIG. 5. Each endcap contains a nut plate 149, shown in cross section in FIG. 6. The approximately rectangular nut plate is trapped on four sides by the endcap, and vertically sandwiched between the track and the endcap. Each nut plate 149 has a central aperture, not shown.

An aperture extends vertically through roof rail 140 proximate each of the first and second ends, aligned with the aperture of the nut plates, to receive a fastener assembly 150. Each fastener assembly 150 extends down through aperture 136 of track 106 (see FIG. 4), the vehicle roof, roof rail 140, and into nut plate 149. Fastener assembly 150 thereby secures the track to the roof and to bracket 110, as well as securing endcap 148 to roof rail 140 of the bracket. In the present example, the fastener assembly includes a bolt, a steel washer inside the track, and a rubber bushing under the washer for waterproofing.

Referring now to FIG. 6, each support member 144 is generally L-shaped, and may be described as having a horizontal section connected to bar foot 142 and a vertical section received by the corresponding sleeve 152. Each section is sized to appropriately space roof rail 140 from bar foot 142 in the respective direction. In other words, support members 144 are sized and shaped to connect roof rail 140 and bar foot 142 with the roof rail parallel the bar foot, but spaced apart in both horizontal and vertical directions.

Bracket 110 may be described as having a vertical height 157, as measured between a central line of top surface 146 on roof rail 140, and a center point of a bar contact surface 164 of bar foot 142. Bracket 110 may also be described as having a lateral width 159, as measured between the central line of top surface 146 on roof rail 140, and center point of bar contact surface 164 of bar foot 142.

In the present example, both vertical height 157 and lateral width 159 of bracket 110 are adjustable. That is, the front bracket may be described as vertically adjustable or as having an adjustable height. The front bracket may also be described as laterally adjustable, and/or as adjustable in an inboard-outboard direction. Vertical adjustment may allow system 100 to be mounted on safety bar assemblies with a range of spacing from the vehicle roof, while lateral adjustment may allow system 100 to be mounted to safety bar assemblies with a range of widths. The system may therefore be compatible with a variety of safety bar assemblies including factory installed sport bar assemblies, after market roll cages, and/or custom bars. The system may therefore also easily accommodate standard variation in vehicle production, and/or provide tolerance for imprecision in installation.

Support members 144 are received in corresponding sleeves 152, each of which is fixed to an underside of roof rail 140. Sleeves 152 are adjustable on support members 144, and a fastener assembly secures the sleeve relative to the support member. Sleeve 152 and roof rail 140 may be adjusted up and down as indicated by the dashed arrows in FIG. 6.

In the present example, a bolt 151 extends through a circular aperture in sleeve 152 and engage a nut 153 in an elongate slot 155 of support member 144. The support member may be thereby securable relative to the sleeve with the nut in a plurality of positions along the slot, corresponding to a plurality of effective heights for the support member.

Referring again to FIG. 5, bar foot 142 includes an upper portion 154 and a lower portion 156, to allow lateral adjustment of front bracket 110. In the present example, both support members 144 and upper portion 154 are a unitary component. Upper portion 154 and lower portion 156 are fixed together by a fastener 158 proximate a first one support member 144, and a fastener 160 proximate the second support member 144. Each fastener extends through an elongate slot in upper portion 154 and a circular aperture in lower portion 156, to allow fastening in a plurality of lateral positions.

To further facilitate lateral adjustment upper portion 154 and lower portion 156 each include teeth 162 on engaging surfaces. In the present example, the engaging surfaces are planar and the upper portion has a greater number of teeth than the lower portion. Engagement between the teeth may define a set of discrete relative lateral positions between upper portion 154 and lower portion 156. As indicated by dashed arrows in FIG. 6, a user may move lower portion 156 left and right to select an appropriate engagement position of teeth 162, and then tighten the fastener to fix the upper and lower portions together in a desired configuration of bracket 110.

Lower portion 156 of bar foot 142 includes lower surface 164, which is configured to contact longitudinal bar 118 of the roll cage. Lower surface 164 is curved to conform to the bar 118, and may be curved to match a diameter of a specific bar size and/or to accommodate an anticipated range of bar diameters. Fastener 160 may engage a weld nut or mount point of longitudinal bar 118, and bar foot 142 to fix bracket 110 to the bar. That is, bracket 110 may be aligned with an existing aperture in longitudinal bar 118 and the user may insert a bolt of fastener 160 through the bar and bar foot 142 to engage a nut retained in the slot of upper portion 154 of the bar foot.

Lower portion 156 may be described as an adapter, allowing mounting of bracket 110 to a specific safety bar assembly and/or bar geometry. In some examples, system 100 may include additional adapters and/or may be configured for use with other adapters to allow mounting to other vehicles and/or safety bar assemblies.

Components of bracket 110 may comprise aluminum 6005, 6063, AA 380, and/or any other appropriate material. The components may be cast, extruded, machined, and/or produced by any effective method. The components may be welded, bonded, fastened and/or otherwise fixed together. In the present example, sleeve 152 is 6005 aluminum welded to roof rail 140. Support member 144 and upper portion 154 of bar foot 142 are cast AA 380 aluminum, and lower portion 156 is extruded and machined 6063 aluminum. Fasteners 150 each include an M8 Torx bolt and Q235 dual washer with adjustment, fastened into an M8 nut plate of an endcap 148. Fastener 158 includes a M5 Torx bolt, and fastener 160 includes an M8 bolt and nut.

Figure 7:
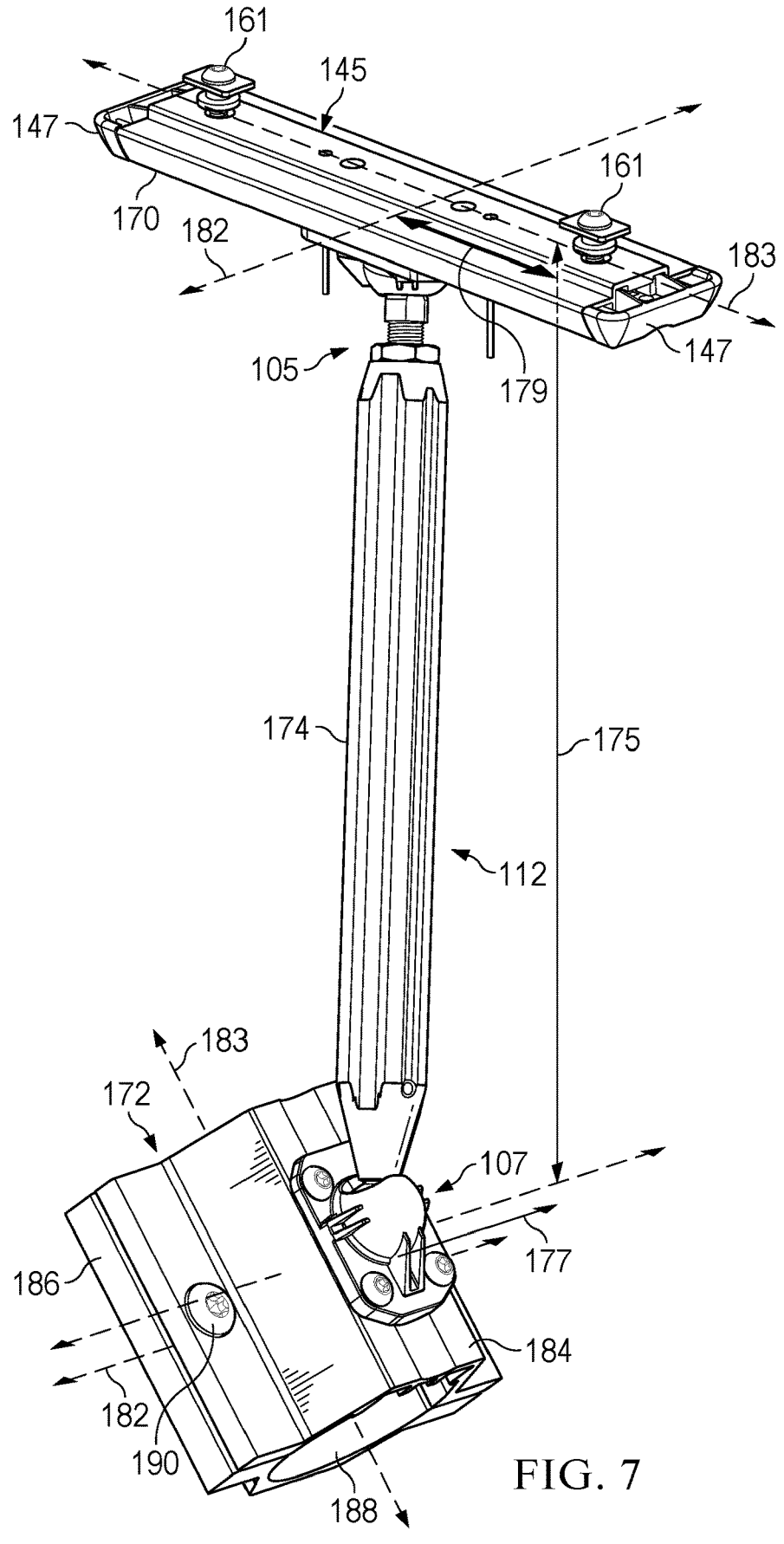
FIG. 7 is an isometric view of a rear left bracket of the roof track system of FIG. 2.

FIG. 7 shows right-side rear bracket 112 in isolation. The left-side rear bracket may be understood to be substantially structurally equivalent, but mirror image. Bracket 112 includes a roof rail 170 and a bar foot 172, connected by a support member 174.

Roof rail 170 has a top surface 145, configured to contact the underside of the vehicle roof. In the present example, top surface 145 has a raised planar central section and is configured to conform to a raised channel in a Jeep hard-top. In general, top surface 145 may have any shape or structure appropriate for effective contact with an inner surface of a vehicle roof.

When supporting a track, roof rail 170 is parallel and aligned with the track. Similarly to roof rail 140 of front bracket 110 (see FIG. 5), roof rail 170 has an endcap 147 at each of a first end a second end, each endcap containing a nut plate. An aperture extends vertically through roof rail 170 proximate each of the first and second ends, aligned with the aperture of the nut plates, to receive a fastener assembly 161. Each fastener assembly 161 extends down through aperture 136 of track 106 (see FIG. 4), the vehicle roof, and roof rail 170, into a nut plate. The track is thereby secured to the roof and to bracket 112. In the present example, fastener assemblies 161 each include a bolt, a steel washer inside the track, and a rubber bushing under the washer for waterproofing.

Bar foot 172 is configured for attachment to a roll cage bar, in the present example particularly a descending rear bar of the roll cage of a Jeep JK 4-door. The bar foot includes an upper portion 184 and a lower portion 186, to encompass a round bar. Each of the upper and lower portions has a curved engaging surface, which together define a passage 188 configured to receive the bar. Passage 188 may be sized and shaped to match a specific bar type and/or to accommodate an anticipated range of bars.

Each of upper portion 184 and lower portion 186 includes wings on opposing sides, the upper and lower portions being fixed together by fasteners 190 extending through corresponding apertures in the matched wings. Lower portion 186 of bar foot 172 further includes one or more apertures positioned to match existing weld nuts or mount points on an underside of the roll cage bar. Fasteners 173, shown in FIG. 10, extending through the apertures of lower portion 186 may fix the lower portion, and thereby rear bracket 112, to the sloping bar.

Lower portion 186 may be described as an adapter, allowing mounting of bracket 112 to a specific roll cage and/or bar geometry. In some examples, system 100 may include additional adapters and/or may be configured for use with other adapters to allow mounting to other vehicles and/or roll cages.

Support member 174 is connected to an underside of roof rail 170 by a first joint 105, and to upper portion 184 of bar foot 172 by a second joint 107. Each joint is a ball joint, allowing rotation and pivoting of support member 174 relative to the roof rail and the bar foot. Joints 105, 107 may also be described as ball and socket joints. In the present example, each joint includes a PA66 and GF35 ball housing with an internal M10 ball joint stud. In some examples, equivalent motion of support member 174 relative to roof rail 170 and/or bar foot 172 may be achieved using other connection types.

In the present example, support member 174 is linear, rigid, and substantially cylindrical. As discussed further below with reference to FIG. 10, the support member includes a hollow cylinder with threaded ends. In some examples, support member 174 may have other cross-sectional shapes, may be solid, and/or may include other features. For instance, the support member may include to sections connected by a hinge, ball joint, or other rotatable and/or pivotable connection.

Each of roof rail 170 and bar foot 172 may be described as having a lateral axis 182 and a longitudinal axis 183. Bracket 112 may be described as having a lateral width 177 and a longitudinal width 179, as measured along the lateral and longitudinal axes of roof rail 170, between a center point of top surface 145 on roof rail 170 and a center top point of passage 188 through bar foot 142. Bracket 112 may also described as having a vertical height 175 as measured along a vertical axis of roof rail 170, between the center point of top surface 145 and the center top point of passage 188.

The height and widths may equivalently be measured according to another reference frame, such as a reference frame of a vehicle in which the bracket is installed. Under any such definition, the importance may lie in changes to the lateral width, longitudinal width, and/or vertical height of the bracket.

In the present example, each of vertical height 175, lateral width 177, and longitudinal width 179 of bracket 112 are all adjustable. That is, the rear bracket may be described as vertically adjustable or as having an adjustable height. The rear bracket may also be described as laterally adjustable, and/or as adjustable in an inboard-outboard direction. The rear bracket may also be described as longitudinally adjustable, and/or as adjustable in a forward-backward direction.

Rear bracket 112 may also be described as allowing adjustment of the relative orientation of roof rail 170 and bar foot 172. That is, using joints 105, 107 the roof rail and bar foot may be pivoted to change an angle between lateral axis 182 of roof rail 170 and lateral axis 182 of bar foot 172 and/or an angle between longitudinal axis 183 of the roof rail and longitudinal axis 183 of the bar foot. The lateral axes and/or longitudinal axes may be adjusted to occupy the same plane.

In the present example, limitations of joints 105, 107 may prevent longitudinal axes 183 of the roof rail and the bar foot from being parallel. However, the roof rail and bar foot may be adjusted to bring the lateral axes 182 in to parallel orientation.

Such adjustment may allow system 100 to be mounted on a variety safety bar assemblies including factory installed sport bar assemblies, after market roll cages, and/or custom bars. The system may thereby also easily accommodate standard variation in vehicle production, and/or provide tolerance for imprecision in installation. In particular, the adjustability of rear bracket 112 may allow the rear bracket to be positioned last when installing system 100. The rear bracket may then be adjusted to match both the respective track and pre-existing mount points on the safety bar assembly.

Figure 8:
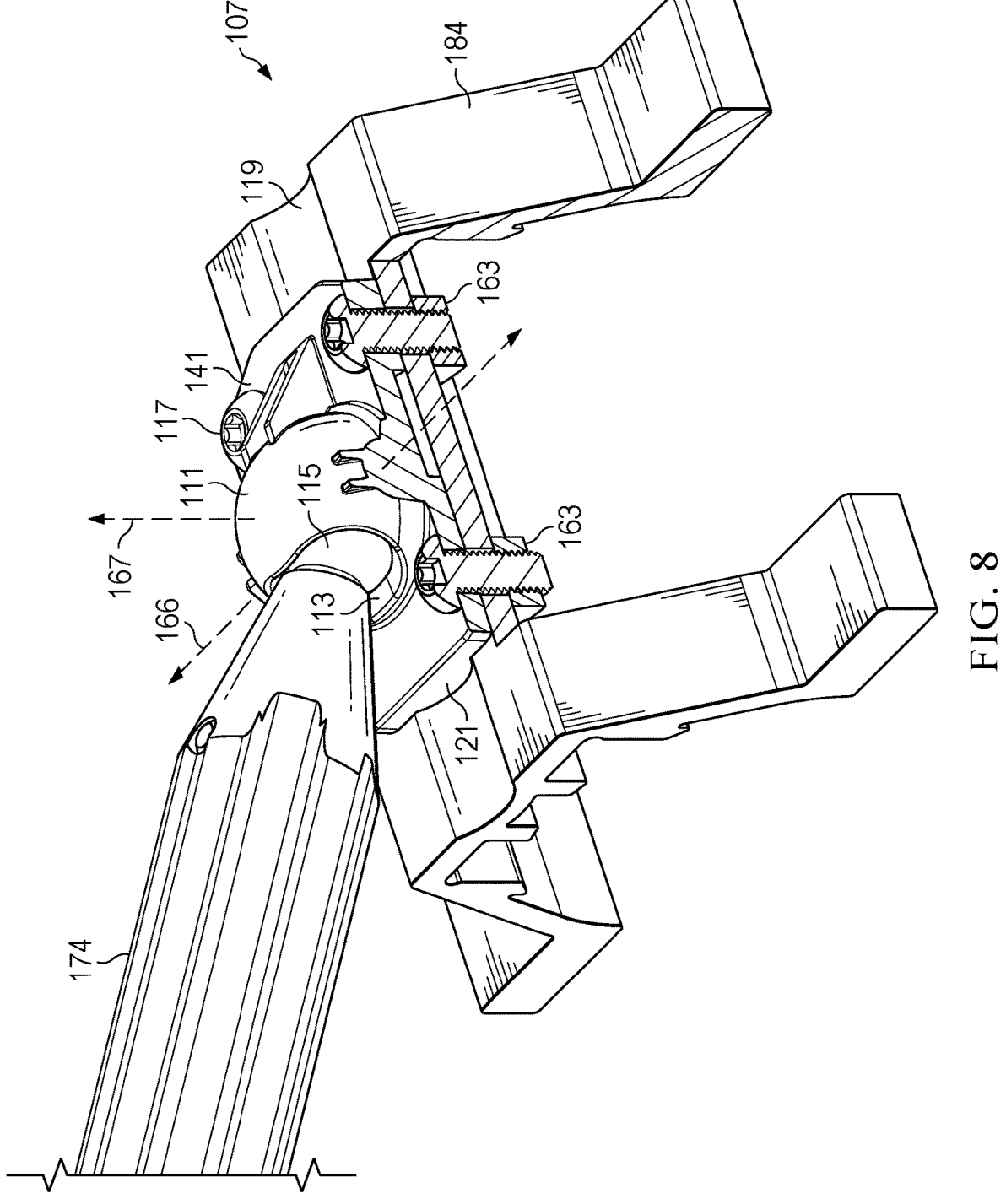
FIG. 8 is a partially cut away isometric view of a lower joint of the bracket of FIG. 7.

FIG. 8 depicts a lower end of support member 174 connected to upper portion 184 of the bar foot by second joint 107. The joint includes a housing plate 141, having a hemispherical socket 111 with an elongate opening 113. A section of the housing plate and upper portion 184 are cut away to show the connection of the housing plate to the bar foot.

Housing plate 141 is fixed to upper portion 184 by bolts 117. The bolts extend through apertures on either side of a curved channel 119 in the upper portion, to be received by corresponding nuts 163. Each nut 163 is received in a rectangular channel on a lower or inside surface of upper portion 184, such that contact between the nuts and a received bar is avoided. A curved protrusion 121 on an underside of housing plate 141 is received in channel 119, facilitating proper alignment and transferring lateral forces between the joint and bar foot.

A ball 115 attached to the lower end of support member 174 is received in socket 111. Opening 113 of socket 111 may be described as lobed and/or bean-shaped or eight-shaped, having a circumferential extent around the socket. Opening 113 is positioned proximate a lower edge of the hemisphere of socket 111, on an upper or forward side of housing plate 141. The circumferential extent of opening 113 may define a range of pivotal motion of support member 174. Contact between support member 174 and socket 111 at the edge of opening 113 may limit pivoting motion of the support member relative to bar foot 172.

Support member 174 may be described as pivotable about a first joint axis 166 and a second joint axis 167 of second joint 107. The first and second joint axes are mutually orthogonal. Orientation of each joint axis may be defined by position and extent of opening 113. In the present example, each pivot axis may be described as approximately orthogonal to a roll cage bar secured by bar foot 172.

In the present example, support member 174 has an angular range between approximately 10 and 30 degrees around first joint axis 166, and an angular range between approximately 60 and 80 degrees around second joint axis 167. Due to the lobed shape of opening 113, the angular range around first joint axis 166 may depend on an orientation of support member 174 relative to second joint axis 167. In general, opening 113 may have any shape and/or dimensions appropriate to achieve any appropriate angular range, according to an effective range of adjustability needed for an intended application. Opening 113 may have dimensions appropriate to achieve any appropriate angular range, according to an effective range of adjustability needed for an intended application.

Ball 115 may move freely in socket 111 such that support member 174 is rotatable through a full 360 degrees. Support member 174 may be described as rotating about an elongate axis of the support member, the elongate axis being pivotable relative to bar foot 172.

Figure 9:
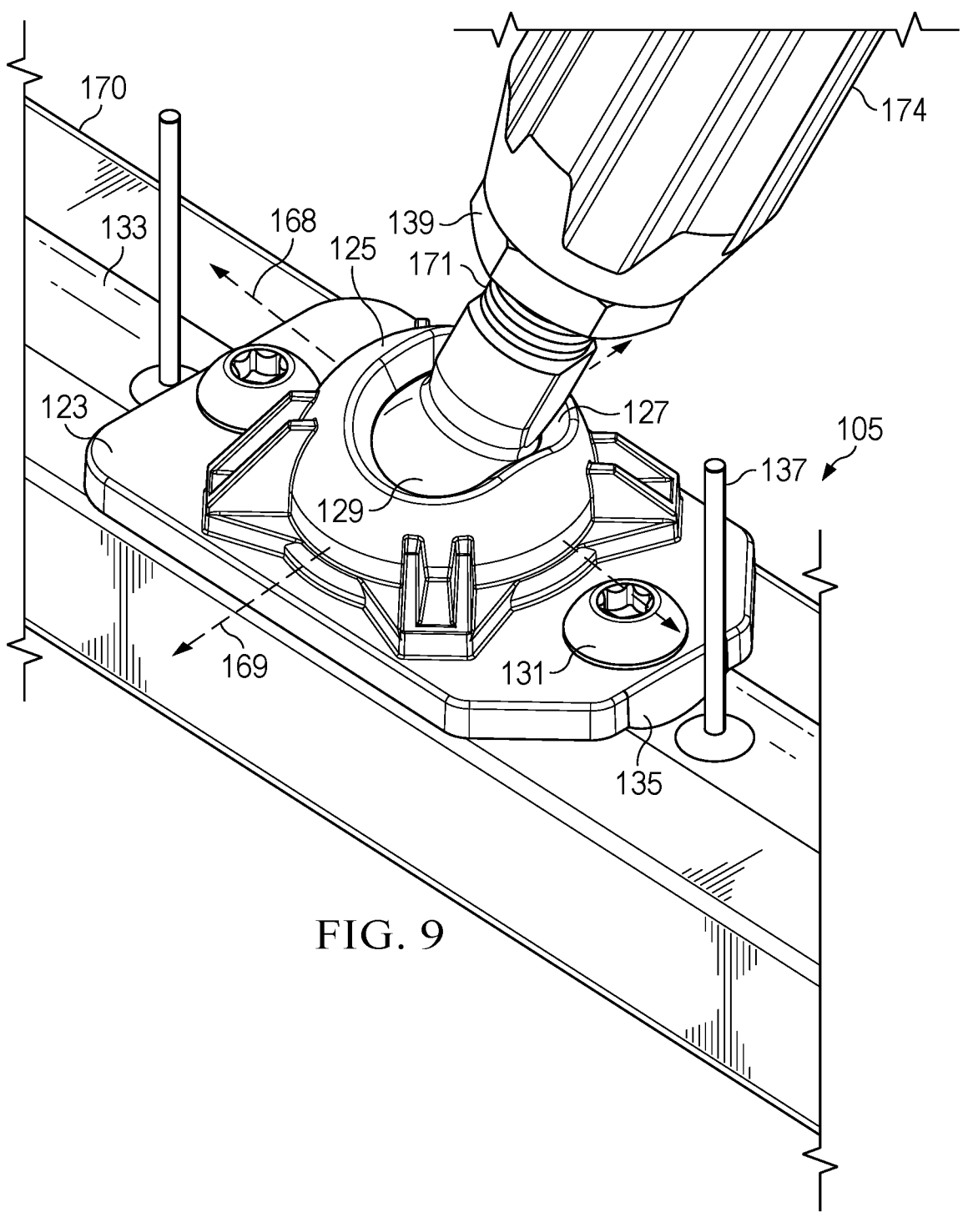
FIG. 9 is an isometric view of an upper joint of the bracket of FIG. 7.

FIG. 9 depicts an upper end of support member 174 connected to the underside of roof rail 170 by first joint 105, as viewed from below. The joint includes a housing plate 123, having a hemispherical socket 125 with an elongate opening 127. An engaging member includes a ball 129 at one end, received in socket 125, and a threaded shaft 171 at an opposite end, received in support member 174.

Housing plate 123 is fixed to roof rail 170 by a pair of bolts 131. The bolts extend through apertures on either side of a curved channel 133 in the underside of the roof rail, to be received by a corresponding nut plate 181, shown in FIG. 10. A curved protrusion 135 on an underside of housing plate 123 is received in channel 133, facilitating proper alignment and transferring lateral forces between the joint and bar foot. The corresponding nut plate is fixed in place by one or more rivets 137.

Opening 127 of socket 125 is similarly shaped to opening 113 of socket 111 of second joint 107, and has a similar circumferential extent around socket 125. Opening 127 is positioned proximate but below a vertex of the hemisphere of socket 125, on a forward side of housing plate 123. The circumferential extent of opening 127 may define a range of pivotal motion of support member 174. Contact between engaging member 129 and socket 125 at the edge of opening 127 may limit pivoting motion of the support member relative to roof rail 170.

Support member 174 may be described as pivotable about a third joint axis 168 and a forth joint axis 169 of first joint 105. The third and fourth joint axes are mutually orthogonal. Orientation of each joint axis may be defined by position and extent of opening 127. In the present example, third joint axis 168 may be described as forming an oblique angle with roof rail 170 and fourth joint axis 169 may be described as orthogonal to the roof rail.

In the present example, support member 174 has an angular range between approximately 60-80 degrees around third joint axis 168, and an angular range between approximately 10 and 30 degrees around fourth joint axis 169. Due to the lobed shape of opening 127, the angular range around forth joint axis 169 may depend on an orientation of support member 174 relative to third joint axis 168. In general, opening 127 may have any shape and/or dimensions appropriate to achieve any appropriate angular range, according to an effective range of adjustability needed for an intended application.

Ball 129 may move freely in socket 111 such that support member 174 is rotatable through a full 360 degrees. Support member 174 may be described as rotating about an elongate axis of the support member, the elongate axis being pivotable relative to roof rail 170. Support member 174 is rigid, such that rotation of the support member in first joint 105 may rotate bar foot 172 relative to roof rail 170 and/or rotate support member 174 in second joint 107.

Figure 10:
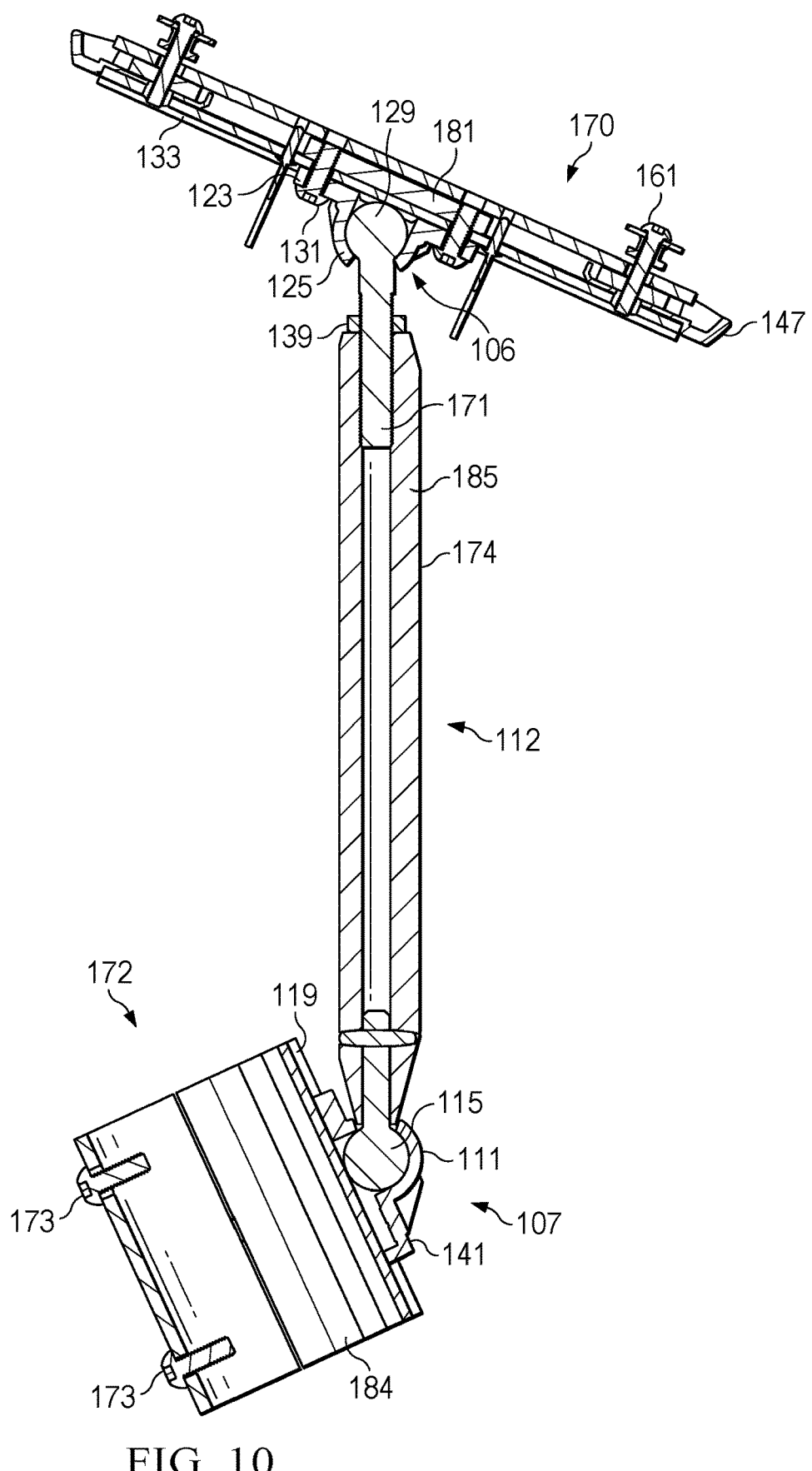
FIG. 10 is a cross-sectional view of the bracket of FIG. 7, arranged with longitudinal axes of the roof rail and bar foot in a common plane, taken along that plane.

FIG. 10 is a cross-sectional view of rear bracket 112, where the bracket is adjusted to have no lateral width 177 (see FIG. 7) and roof rail 170 is adjusted to longitudinal alignment with bar foot 172, to best show the components of bracket 112. That is longitudinal axes 183 (see FIG. 7) of the roof rail and the bar foot occupy the same plane.

As discussed above, in the present example support member 174 comprises multiple components. A hollow cylindrical bar 185 makes up the primary structure of the support member, tapering at upper and lower ends. An outer surface of bar 185 is ridged, which may improve grip for a user adjusting rear bracket 112. At the lower end, bar 185 receives a shaft fixed to ball 115. The shaft is riveted to bar 185, and ball 115 is received in lower joint 107.

Support member 174 may be described has having an adjustable length. At the upper end, bar 185 is internally threaded to engage shaft 171 attached to ball 129. In the present example, an extent of threaded shaft 171 received in cylindrical bar 185 is adjustable. That is, shaft 171 can be screwed into and out of bar 185 to alter a distance between balls 129 and 115. Support member 174 further includes a jam nut 139 surrounding and engaging the threaded shaft. Tightening the jam nut may fix shaft 171 relative to bar 185. To adjust the length of the support member, a user may loosen the jam nut, rotate the threaded shaft, and tighten the jam nut.

In general, support member 174 may comprise any structure or structures of sufficient strength, and any end features appropriate to joints 105, 107.

Components of rear bracket 112 may comprise aluminum 6005, 6063, AA 380, and/or any other appropriate material. The components may be cast, extruded, machined, and/or produced by any effective method. The components may be welded, bonded, fastened and/or otherwise fixed together. In the present example, housing plate 123 is connected to roof rail 170 by M6 bolts engaging an internal nut plate. Support member 174 is an extruded 6005 aluminum strut with an M5 knurled pin engaging second joint 107, including an M10 jam nut. Housing plate 141 is fixed to bar foot 172 by M6 bolts.

Referring again to FIGS. 7-9, support member 174 and/or rear bracket 112 may be described as adjustable along three independent axes. Rear bracket 112 may also be described as three-dimensionally adjustable or as having three degrees of freedom. That is, the support member is adjustable along a lateral axis, a longitudinal axis, and a vertical axis. Adjustment may be accomplished by pivoting support member 174 about the first, second, third, and forth pivot axes, 166, 167, 168, 169 and extending the length of the support member.

Support member 174 may also be described as independently pivotable relative to roof rail 170 and bar foot 172. That is, pivoting the support member around the first or second pivot axes does not require pivoting about the third or fourth pivot axes, providing the bar foot is free to move. Equally, pivoting the support member around the third or fourth pivot axes does not require pivoting about the first or second pivot axes, providing the roof rail is free to move.

The adjustability of rear bracket 112 may allow use in a range of vehicles and/or accommodate large tolerances in vehicle manufacture. Such adjustability may also be helpful in mounting of separate, independent tracks on the roof of a vehicle. Non-adjustable brackets may have little to no tolerance in placement of roof holes, and may lead to non-parallel tracks or tracks out of square with the vehicle. A user may need to first mount the brackets and then drill corresponding holes, without recourse to adjust track placement. Incorrectly aligned tracks may cause difficulty in attaching roof rack accessories such as cross bar towers, and/or reduce the safety of such attachment.

A roof track mounting system including rear bracket 112 may allow a user to position the tracks as appropriate and desired before mounting the rear bracket. More specifically, the user may install a pair of front brackets, such bracket 110 described above. The user may then drill a single hole on the left and right sides of the roof, corresponding to a specified hole in each front bracket. These two holes may be drilled from inside the vehicle.

Using one of the drilled holes as a reference for each track, the user may position a pair of separate, independent tracks on the roof of the vehicle. The user may use a measuring tool such as a tape measure to ensure that the two tracks are parallel and square to one another, as well as in alignment with the two drilled holes. The user may then drill all remaining mounting holes through the roof from outside the vehicle, using the tracks as a reference for the hole positions.

Two rear brackets 112 may be adjusted to match both existing roll cage holes and the drilled roof holes. A length of the support member of each bracket may be adjusted, and the support member pivoted and/or rotated around each of the first and second joints. Finally, all remaining hardware may be installed, mounting the four brackets to the roll cage and through the roof to the two tracks.

B. Illustrative Roof Track System

Figure 11:
FIG. 11 is an isometric view of another illustrative roof track system.

As shown in FIGS. 11-15, this section describes an illustrative roof track system 200. System 200 is another example of a vehicle roof track system, as described above. As shown in FIG. 11, track system 200 includes two tracks 206, two front brackets 210, and two rear brackets 212. That is, each track 206 is mounted to a front bracket 210 and a rear bracket 212. Track system 200 has many structural and functional similarities to track system 100, and corresponding parts are therefore referenced with corresponding numbers.

Figure 12:
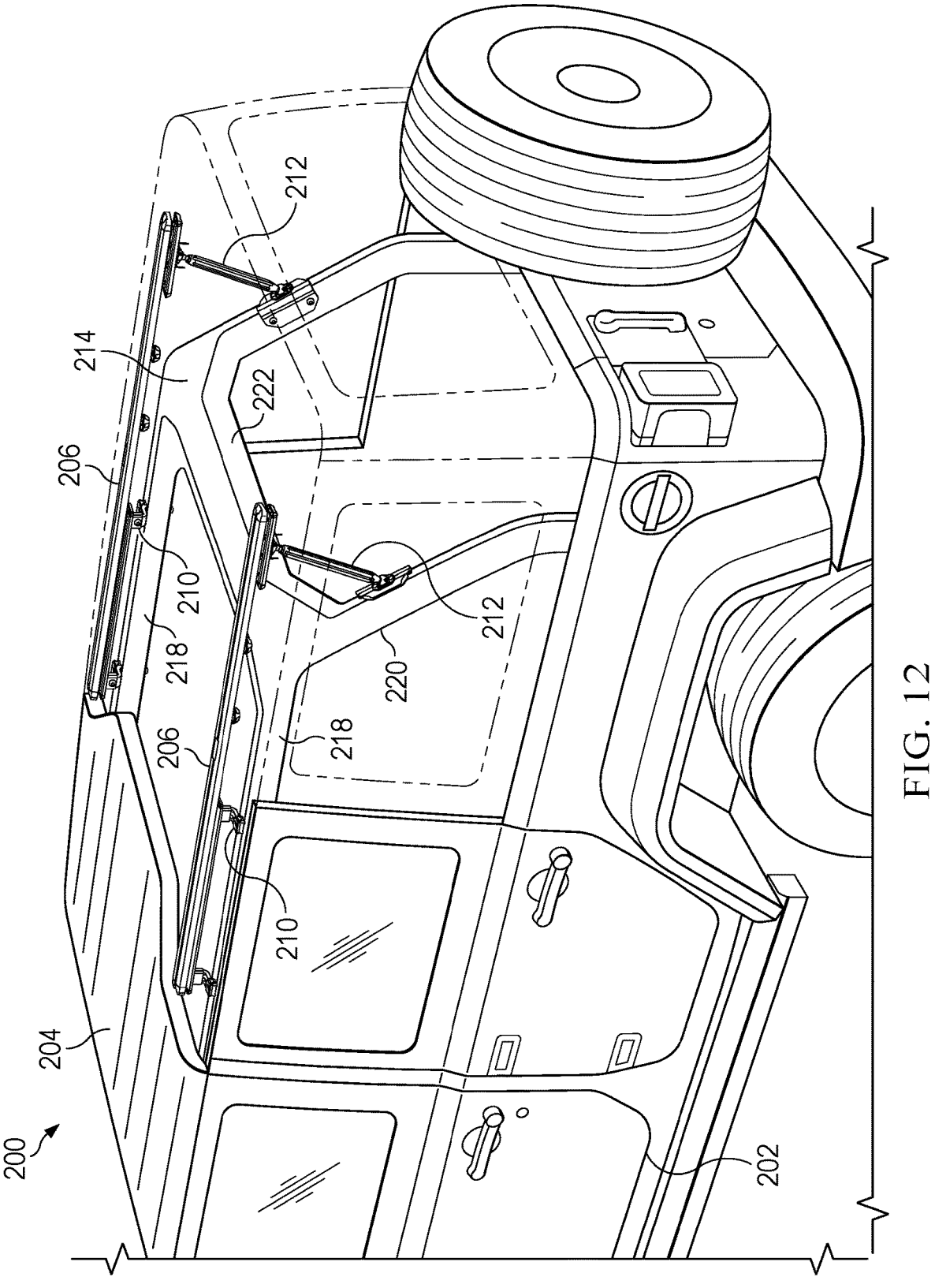
FIG. 12 is an isometric view of the system of FIG. 11, installed on a safety bar assembly of a vehicle, with a portion of a roof of the vehicle depicted as semi-transparent.

In FIG. 12, track system 200 is shown mounted to a safety bar assembly 214 of a vehicle 202, with a roof 204 of the vehicle depicted as partially transparent. This illustrative track system is configured for use with a Jeep JL model, and in the present example safety bar assembly 214 is a roll cage. Roll cage 214 may be described as including left and right horizontal longitudinal bars 218, left and right sloping longitudinal bars 220, and a rear horizontal lateral bar 222. Unlike roll cage 114 described above, horizontal bars 218 and sloping bars 220 are approximately square in cross-section.

Tracks 206 are located exterior to the vehicle, on top of roof 204. A lower surface of each track contacts an upper exterior surface of the roof. Brackets 210, 212 are located interior to the vehicle, under roof 204. An upper surface of each bracket contacts a lower interior surface of the roof. Fasteners extend through the roof to fasten each track to the corresponding pair of brackets.

Tracks 206 may be similar to or the same as tracks 106, described above. The two tracks 206 may be understood to be substantially equivalent to one another in structure. In the present example, each track 206 includes a base plate and a body which defines a T-slot. A plurality of apertures extend vertically through the body and base plate to correspond with apertures of the brackets, allowing the track to be fastened to the brackets through the aligned apertures.

Figure 13:
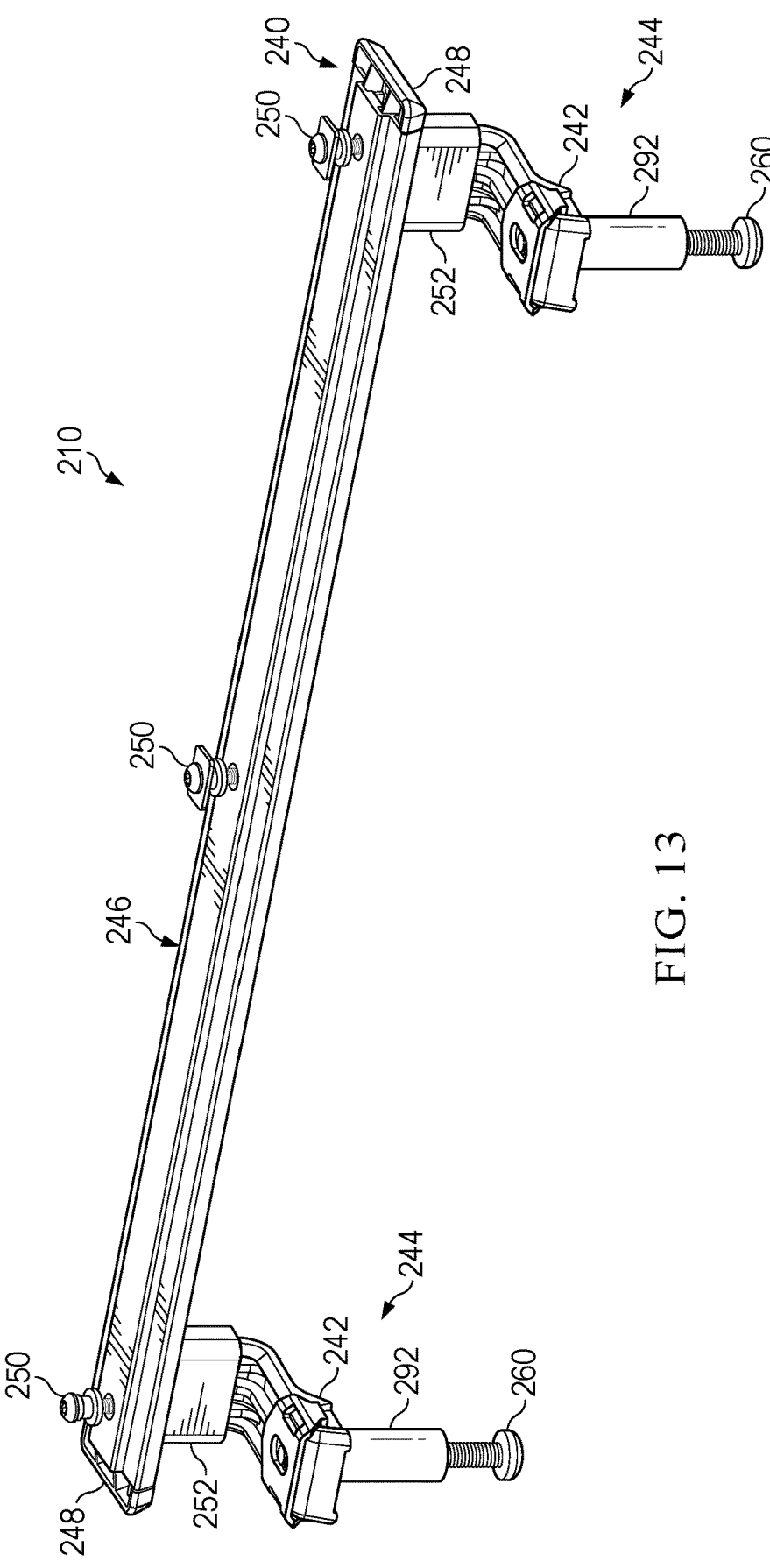
FIG. 13 is an isometric view of a front left bracket of the roof track system of FIG. 11.

FIG. 13 shows left-side front bracket 210. The right-side front bracket may be understood to be substantially structurally equivalent, but mirror image. Front bracket 210 includes a roof rail 240 and two support members 244. Each support member 244 may be described as ending in a bar foot 242. Roof rail 240 has a top surface 246, configured to contact the underside of the vehicle roof. When supporting a track, roof rail 240 may be parallel and aligned with the track. Roof rail 240 has an endcap 248 at each of a first end a second end, and each endcap may contain a nut plate. An additional nut plate may be positioned in a rectangular opening on an underside of the roof rail, proximate a center point of the roof rail.

An aperture extends vertically through roof rail 240 proximate the center point and each of the first and second ends, to receive a fastener assembly 250. Each fastener assembly 250 extends down through aligned apertures in the track, the vehicle roof, and roof rail 240. The fastener may engage the corresponding nut plate in the roof rail.

Support members 244 are received in corresponding sleeves 252, each of which is fixed to an underside of roof rail 240. Each support member 244 is generally L-shaped, and may be described as having a horizontal section ending in a bar foot 242 and a vertical section received by the corresponding sleeve 252. Each section is sized to appropriately space roof rail 240 from bar feet 242 in the respective direction.

Bar foot portion 242 of each support member 244 includes a lower surface configured to contact a horizontal longitudinal bar of the roll cage. For each support member 244, a fastener 260 engages a weld nut or mount point of the longitudinal bar, extending through a standoff tube 292 to bar foot 242. Bracket 210 is thereby fixed to the bar. That is, bracket 210 may be aligned with two existing apertures in the bar. The user may insert a bolt of each fastener 260 through the bar and bar foot 242 to engage a nut retained in a slot on an upper side of the bar foot. In the present example, standoff tubes 292 are machined Q235 steel and fasteners 260 include M8 Torx bolts.

Figure 14:
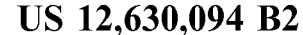
FIG. 14 is an isometric view of a rear left bracket of the roof track system of FIG. 11.

FIG. 14 shows right-side rear bracket 212. The left-side rear bracket may be understood to be substantially structurally equivalent, but mirror image. Rear bracket 212 includes a roof rail 270 and a bar foot 272, connected by a support member 274.

Support member 274 is connected to an underside of roof rail 270 by a first joint 205, and to bar foot 272 by a second joint 207. Each joint is a ball joint, allowing rotation and pivoting of support member 274 relative to the roof rail and the bar foot. Roof rail 270, support member 274, and first joint 205 are substantially equivalent to roof rail 170, support member 174, and first joint 105 as described in Example A, above.

Support member 274 may be described as pivotable about a first joint axis and a second joint axis, as defined by first joint 205, forming an oblique angle with roof rail 270. Support member 274 is rotatable through a full 360 degrees in first joint 205. Support member 274 may be described as rotating about an elongate axis of the support member, the elongate axis being pivotable relative to roof rail 270. Support member 274 is rigid, such that rotation of the support member in first joint 205 may rotate bar foot 272 relative to roof rail 270 and/or rotate support member 274 in second joint 207. Support member 274 may be described as having an adjustable length.

Bar foot 272 is configured for attachment to a safety bar, in the present example particularly a descending rear bar of the roll cage of a Jeep JL model. Bar foot 272 has a corner or L-shape, similar to an angle iron, and may be described as having first and second planar sections meeting at an approximately 90 degree angle. An upper one of the planar sections is joined to a lower end of support member 274. The other, or inboard, one of the planar sections includes two apertures positioned to match existing weld nuts or mount points on an inboard side of a sloping bar of the vehicle roll cage. Fasteners 296 extend through the apertures of bar foot 272 to engage the bar, thereby fixing the bar foot and rear bracket 212 to the sloping bar.

In some examples, an inner surface of bar foot 272 may be covered with a pad, to protect the appearance of an attached roll cage bar. For instance, an EVA foam pad may prevent scratching or smudging of paint on the bar by bracket 212.

Figure 15:
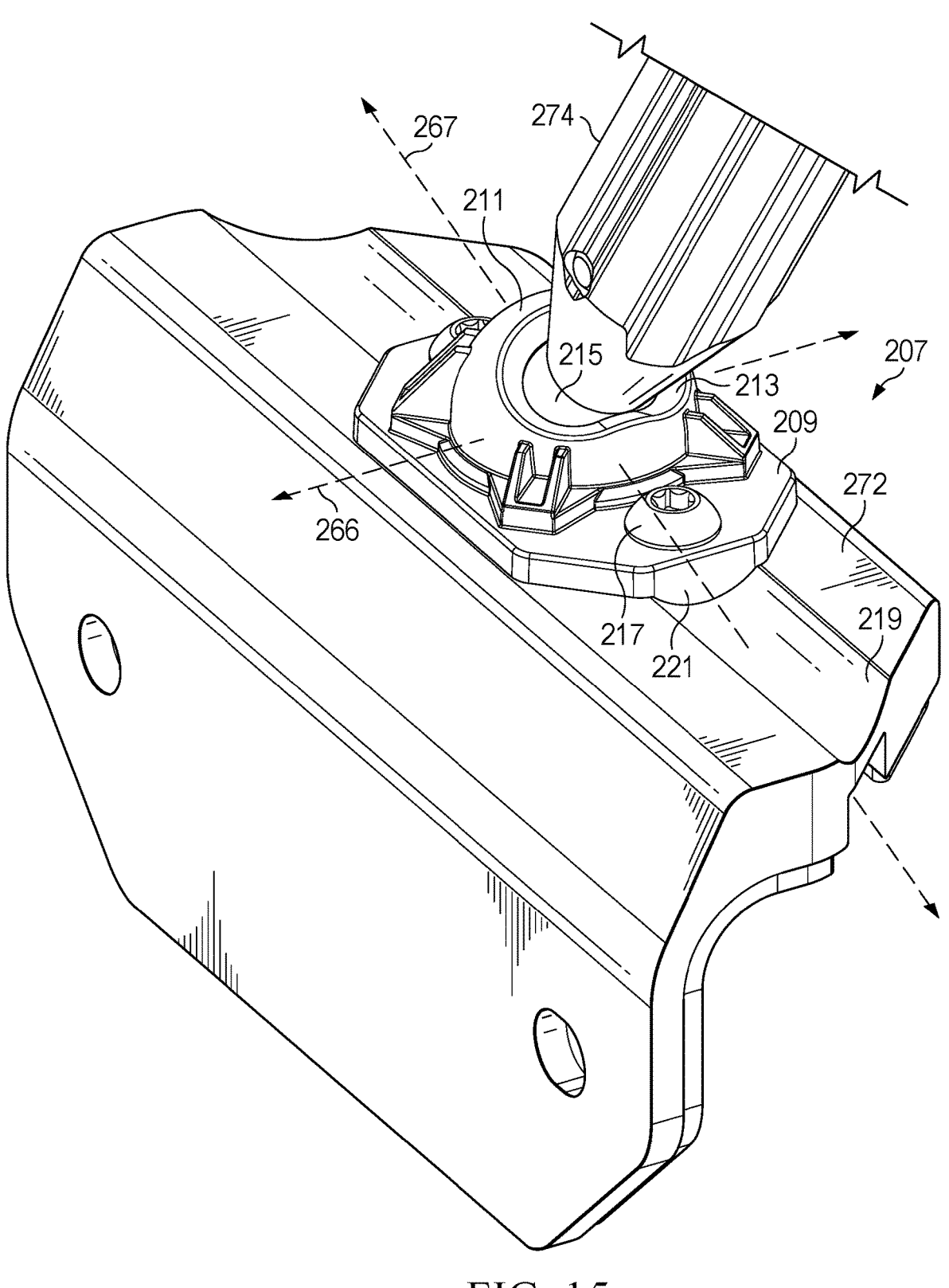
FIG. 15 is an isometric view of a lower joint of the bracket of FIG. 14, facing in a direction approximately opposite the view of FIG. 14.

FIG. 15 depicts a lower end of support member 274 connected to the upper planar section of bar foot 272 by joint 207. The joint includes a housing plate 209, having a hemispherical socket 211 with an elongate opening 213. A ball 215 attached to the lower end of support member 274 is received in socket 211. The ball may be formed on a shaft received in the support member and riveted or otherwise fixed in place.

Housing plate 209 is fixed to bar foot 272 by a pair of bolts 217. The bolts extend through apertures on either side of a curved channel 219 in the upper planar section, to be received by corresponding nuts (not shown). A curved protrusion 221 on an underside of housing plate 209 is received in channel 219, facilitating proper alignment and transferring lateral forces between the joint and bar foot.

Opening 213 of socket 111 may be described as lobed and/or bean or eight shaped, having a circumferential extent around the socket. Opening 213 is positioned on an upper or forward side of housing plate 209. The circumferential extent of opening 213 may define a range of pivotal motion of support member 274. Contact between support member 274 and socket 211 at the edge of opening 213 may limit pivoting motion of the support member relative to bar foot 272.

Support member 274 may be described as pivotable about a third joint axis 266 and a fourth joint axis 267 of second joint 207. The third and fourth joint axes are mutually orthogonal. Orientation of each joint axis may be defined by position and extent of opening 213. In the present example, third joint axis 266 may be described as orthogonal to a roll cage bar secured by bar foot 272, while fourth joint axis 267 may be described as forming an oblique angle with the roll cage bar. In the present example, around the axis of second joint 207, support member 274 has an angular range of approximately 70 degrees In the present example, support member 274 has an angular range between approximately 10 and 30 degrees around third joint axis 266, and an angular range between approximately 60 and 80 degrees around fourth joint axis 267. Due to the lobed shape of opening 213, the angular range around third joint axis 166 may depend on an orientation of support member 274 relative to fourth joint axis 267.

In general, opening 213 may have any shape and/or dimensions appropriate to achieve any appropriate angular range, according to an effective range of adjustability needed for an intended application. Opening 213 may have dimensions appropriate to achieve any appropriate angular range, according to an effective range of adjustability needed for an intended application.

Ball 215 may move freely in socket 211 such that support member 274 is rotatable through a full 360 degrees. Support member 274 may be described as rotating about an elongate axis of the support member, the elongate axis being pivotable relative to bar foot 272.

Support member 274 and/or rear bracket 212 may be described as adjustable along three independent axes. Rear bracket 212 may also be described as three-dimensionally adjustable or as having three degrees of freedom. That is, the support member is adjustable along a lateral axis, a longitudinal axis, and a vertical axis. Adjustment may be accomplished by pivoting support member 274 about the first, second, third, and forth pivot axes, and extending the length of the support member. Support member 274 may also be described as independently pivotable relative to roof rail 270 and bar foot 272. Rear bracket 212 may be installed similarly to rear bracket 112, as described in Example A, above.

Components of bracket 212 may comprise aluminum 6005, 6063, AA 380, and/or any other appropriate material. The components may be cast, extruded, machined, and/or produced by any effective method. The components may be welded, bonded, fastened and/or otherwise fixed together. In the present example, housing plate 123 is connected to roof rail 170 by M6 bolts engaging an internal nut plate. Support member 174 is an extruded 6005 aluminum strut with an M5 knurled pin engaging second joint 107, including an M10 jam nut. Housing plate 209 is fixed to bar foot 272 by two M6 bolts engaging square nuts.

Illustrative Combinations and Additional Examples

This section describes additional aspects and features of vehicle roof track support structures and roof track mounting systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A roof rack mounted on a vehicle, comprising:

a roof structure of the vehicle;

a roll cage inside the vehicle and including two horizontal longitudinal bars and two angled longitudinal bars;

two tracks mounted on the roof structure of the vehicle, each track supported by a pair of brackets inside the vehicle, and each pair of brackets including a front bracket and a rear bracket;

wherein each front bracket is fastened to one of the longitudinal horizontal bars of the roll cage, and each rear bracket is fastened to one of the angled longitudinal bars.

A1. The roof rack of A0, wherein each bracket of the two pairs of brackets includes a roof rail and a bar foot, the roof rail being fastened to one of the two tracks through the roof structure and the bar foot being fastened to a bar of the roll cage.

A2. The roof rack of A1, wherein each roof rail includes endcaps at first and second opposing ends, each endcap enclosing a nut plate.

A3. The roof rack of A2, wherein each roof rail is fastened to the respective track by fasteners extending through the nut plates.

A4. The roof rack of A1, wherein each bracket includes a support member connected to the roof rail at a first end, and the bar foot at a second end.

A5. The roof rack of A4, wherein the first end of each support member is received in a sleeve fixed to a lower surface of the roof rail.

A6. The roof rack of A5, wherein the first end of each support member includes a vertical slot and the support member is secured to the sleeve by a fastener extending through the slot.

A7. The roof rack of A4, wherein each front bracket includes an additional support member, connected to the roof rail at a first end, and the bar foot at a second end.

A8. The roof rack of A4, wherein each front bracket includes an additional support member, connected to the roof rail at a first end, and an additional bar foot at a second end.

A9. The roof rack of A4, wherein the bar foot of each front bracket includes a curved lower surface, shaped to conform to the corresponding longitudinal horizontal bar.

A10. The roof rack of A1, wherein each roof rail has an upper surface in contact with the roof structure.

A11. The roof rack of A10, wherein the upper surface is planar.

A12. The roof rack of A1, wherein each roof rail is elongate and parallel the two tracks.

A13. The roof rack of A1, wherein the bar foot of each front bracket includes an upper portion and a lower portion, the upper portion being securable in a plurality of lateral positions on the lower portion.

A14. The roof rack of A13, wherein the plurality of lateral positions are a plurality of discrete positions defined by engagement of teeth on the upper and lower portions.

A15. The roof rack of A13, wherein the upper portion includes a lateral slot, and the upper portion is secured to the lower portion by a fastener extending through the slot.

A16. The roof rack of A1, wherein each bar foot is secured to the roll cage by a fastener engaging a weld nut of the roll cage.

A17. The roof rack of A0, wherein each front bracket has an adjustable lateral width.

A18. The roof rack of A0, wherein each bracket of the two pairs of brackets has an adjustable vertical height.

A19. The roof rack of A0, wherein each of the two tracks is fastened to the roof structure.

A20. The roof rack of A0, wherein each track includes a slot extending continuously from a first end to a second end.

A21. The roof rack of A20, wherein each slot includes a main channel and a restricted upper opening.

A22. The roof rack of A21, wherein the main channel has a wider upper portion and a narrower lower portion, the restricted upper opening being defined by a pair of lips of the track.

A23. The roof rack of A0, wherein the roll cage includes two lateral horizontal bars spanning the longitudinal horizontal bars, and each front bracket is fastened to the corresponding longitudinal horizontal bar between the two lateral horizontal bars.

B0. A roof rack support structure, comprising:

a track having a t-slot;

a front bracket including a first elongate roof rail and a first bar foot oriented to engage a sport bar of a vehicle that is parallel the first elongate roof rail;

a rear bracket including a second elongate roof rail and a second bar foot oriented to engage a sport bar of the vehicle that is at an oblique angle to the second elongate roof rail;

wherein the track is configured for mounting to the first elongate roof rail and the second elongate roof rail by a plurality of fasteners with a roof of the vehicle sandwiched between the rack and the roof rails, such that the track is exterior to the vehicle and the front and rear brackets are interior to the vehicle.

C0. A roof rack of a vehicle, comprising:

a pair of independent tracks on top of a roof of the vehicle, each track having a full length t-slot;

four support brackets inside the vehicle, each bracket being fastened to a respective bar of a roll cage of the vehicle;

wherein each track is fastened to two of the support brackets through the roof.

D0. A method of securing cargo on a vehicle, comprising:

fastening a foot of a bracket to a bar of a roll cage of the vehicle, by engaging a bolt with a pre-existing threaded aperture of the bar;

sandwiching a roof of the vehicle between an elongate member of the bracket and a track having a full-length t-slot;

fastening the track to the elongate member through the roof;

installing a roof rack system in the t-slot of the track; and securing the cargo to the roof rack system.

E0. A roof rack mounted on a vehicle, comprising:

a roof structure of the vehicle;

a roll cage inside the vehicle; and a rack assembly, supported by a bracket inside the vehicle;

wherein the bracket includes a roof rail and a bar foot, pivotably and rotatably connected by a support member.

E1. The roof rack of E0, wherein the roof rail is fastened to the rack assembly through the roof structure, and the bar foot is fastened to a bar of the roll cage.

E2. The roof rack of E0, wherein the bar foot is connected to the support member by a ball and socket joint.

E3. The roof rack of E2, wherein the roof rail is connected to the support member by a ball and socket joint.

E4. The roof rack of E0, wherein the support member is rotatable through 360 degrees.

E5. The roof rack of E0, wherein the support member is pivotable through a limited range.

E6. The roof rack of E0, wherein the support member is pivotable relative to the roof rail along a first axis and pivotable relative to the bar foot along a second axis.

E7. The roof rack of E6, wherein the support member is pivotable through a first angular range along the first axis and a second angular range along the second axis, each of the first and second angular ranges being between 15 and 180 degrees.

E8. The roof rack of E7, wherein each of the first and second angular ranges is between 60 and 120 degrees.

E9. The roof rack of E0, wherein the rack assembly includes a pair of independent tracks, each track having a full length t-slot.

E10. The roof rack of E0, wherein the support member has an adjustable length.

F0. A method of securing cargo on a vehicle, comprising:

creating apertures in a roof of a vehicle;

fastening a foot of a first rear bracket to a bar of a roll cage of the vehicle, by engaging a bolt with a pre-existing threaded aperture of the bar;

aligning a roof rail of the bracket with the apertures in the roof by doing one or more of:

pivoting a support member of the bracket, rotating the support member, and adjusting a length of the support member;

sandwiching the roof of the vehicle between the roof rail and a rack assembly;

fastening the rack assembly to the roof rail through the apertures in the roof; and securing cargo to the rack assembly.

F1. The method of F0, wherein the rack assembly includes a first track and a second track, and further including, prior to the creating apertures step:

fastening a first front bracket to the roll cage;

fastening a second front bracket to the roll cage;

positioning the first track and the second track in parallel, such that the first track is aligned with the first front bracket and the second track is aligned with the second front bracket.

F2. The method of F0, further including:

removing cargo from the rack assembly;

unfastening the foot of the first rear bracket from the bar of the roll cage of the vehicle, by disengaging the bolt from the pre-existing threaded aperture of the bar; and removing the roof of the vehicle, while the rack assembly remains fastened to the roof rail through the apertures in the roof.

G0. A method of mounting a rack on a hardtop vehicle, comprising:

creating apertures in a hardtop of a vehicle;

fastening a foot of a first rear bracket to a bar of a roll cage of the vehicle, by engaging a bolt with a pre-existing threaded aperture of the bar;

aligning a roof rail of the bracket with the apertures;

sandwiching the hardtop of the vehicle between the roof rail and a rack assembly;

fastening the rack assembly to the roof rail through the apertures in the hardtop;

unfastening the foot of the first rear bracket from the bar of the roll cage of the vehicle, by disengaging the bolt from the pre-existing threaded aperture of the bar; and removing the hardtop from the vehicle, while the rack assembly remains fastened to the roof rail through the apertures in the hardtop.

G1. The method of G0, further including reattaching the hardtop to the vehicle, and refastening the foot of the first rear bracket from the bar of the roll cage of the vehicle, by engaging the bolt with the pre-existing threaded aperture of the bar.

H0. A vehicle roof track support structure, comprising:

a rear bracket, including:

a roof rail configured to contact an interior side of a vehicle roof, a bar foot configured to engage a safety bar, and a support member extending between the roof rail and the bar foot, wherein the roof rail and the bar foot are each pivotably and rotatably connected to the support member.

H1. The vehicle roof track support structure of H0, wherein the bar foot is connected to the support member by a ball and socket joint.

H2. The vehicle roof track support structure of H1, wherein the roof rail is connected to the support member by a ball and socket joint.

H3. The vehicle roof track support structure of any of H0-H2, wherein the support member is rotatable through 360 degrees.

H4. The vehicle roof track support structure of any of H0-H3, wherein the support member is pivotable through a limited range.

H5. The vehicle roof track support structure of H4, wherein the support member is pivotable relative to the bar foot along two orthogonal axes.

H6. The vehicle roof track support structure of H5, wherein the support member is pivotable relative to the roof rail along two orthogonal axes.

H7. The vehicle roof track support structure of any of H0-H6, wherein the support member is independently pivotable relative to each of the bar foot and the roof rail.

H8. The vehicle roof track support structure of any of H0-H7, wherein the support member has an adjustable length.

H9. The vehicle roof track support structure of any of H0-H8, further comprising a front bracket, including:

a roof rail configured to contact the interior side of the vehicle roof, a bar foot configured to engage a safety bar, and a pair of support members extending between the roof rail and the bar foot.

H10. The vehicle roof track support structure of H9, wherein the bar foot of the front bracket is configured to engage a horizontal safety bar, and the bar foot of the rear bracket is configured to engage a sloping safety bar.

J0. A vehicle roof track system, comprising:

a track having a T-slot;

a front bracket and a rear bracket, each including:
a roof rail configured to contact an interior side of a vehicle roof,
a bar foot configured to engage a safety bar, and
a support member connecting the roof rail to the bar foot;
wherein the track is fastened to the roof rail of each bracket, and the support member of the rear bracket is pivotably connected to the roof rail and the bar foot of the rear bracket.

J1. The vehicle roof track system of J0, wherein the support member of the rear bracket is rotatable.

J2. The vehicle roof track system of J1, wherein the support member of the rear bracket is independently pivotable along two orthogonal axes relative to each of the roof rail and the bar foot.

J3. The vehicle roof track system of any of J0-J2, wherein each bracket has an adjustable lateral width.

J4. The vehicle roof track system of J3, wherein the bar foot of the front bracket includes an upper portion and a lower portion, the upper portion being securable in a plurality of lateral positions on the lower portion.

J5. The vehicle roof track system of J3 or J4, wherein each bracket has an adjustable vertical height.

K0. A vehicle, comprising:
a roof structure;
a safety bar assembly inside the vehicle; and
two tracks mounted on the roof structure, each track supported by a pair of brackets inside the vehicle;
wherein each bracket includes a roof rail fastened to one of the two tracks through the roof structure, and a bar foot engaging the safety bar assembly; and
wherein a rear bracket of each pair of brackets includes a support member, the roof rail and the bar foot of the rear bracket each being pivotably connected to the support member.

K1. The vehicle of K0, wherein the support member of each rear bracket is connected to the roof rail and the bar foot of the rear bracket by a ball and socket joint.

K2. The vehicle of K0, wherein each bracket has an adjustable lateral width, and an adjustable vertical height.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. A vehicle roof track support structure, comprising:
a rear bracket, including:
a roof rail configured to contact an interior side of a vehicle roof,
a bar foot configured to engage a safety bar, and
a support member extending between the roof rail and the bar foot,
wherein the roof rail and the bar foot are each pivotably and rotatably connected to the support member.

2. The vehicle roof track support structure of claim 1, wherein the bar foot is connected to the support member by a ball and socket joint.

3. The vehicle roof track support structure of claim 2, wherein the roof rail is connected to the support member by a ball and socket joint.

4. The vehicle roof track support structure of claim 1, wherein the support member is rotatable through 360 degrees.

5. The vehicle roof track support structure of claim 1, wherein the support member is pivotable through a limited range.

6. The vehicle roof track support structure of claim 5, wherein the support member is pivotable relative to the bar foot around two orthogonal axes.

7. The vehicle roof track support structure of claim 6, wherein the support member is pivotable relative to the roof rail around two orthogonal axes.

8. The vehicle roof track support structure of claim 1, wherein the support member is independently pivotable relative to each of the bar foot and the roof rail.

9. The vehicle roof track support structure of claim 1, wherein the support member has an adjustable length.

10. The vehicle roof track support structure of claim 1, further comprising a front bracket, including:
a roof rail configured to contact the interior side of the vehicle roof,
a bar foot configured to engage a safety bar, and
a pair of support members extending between the roof rail and the bar foot.

11. The vehicle roof track support structure of claim 10, wherein the bar foot of the front bracket is configured to engage a horizontal safety bar, and the bar foot of the rear bracket is configured to engage a sloping safety bar.

12. A vehicle roof track system, comprising:
a track having a T-slot;
a front bracket and a rear bracket, each including:
a roof rail configured to contact an interior side of a vehicle roof,
a bar foot configured to engage a safety bar, and
a support member connecting the roof rail to the bar foot;
wherein the track is fastened to the roof rail of each bracket, and the support member of the rear bracket is pivotably connected to the roof rail and the bar foot of the rear bracket.

13. The vehicle roof track system of claim 12, wherein the support member of the rear bracket is rotatable.

14. The vehicle roof track system of claim 13, wherein the support member of the rear bracket is independently pivotable around two orthogonal axes relative to each of the roof rail and the bar foot.

15. The vehicle roof track system of claim 12, wherein each bracket has an adjustable lateral width.

16. The vehicle roof track system of claim 15, wherein the bar foot of the front bracket includes an upper portion and a lower portion, the upper portion being securable in a plurality of lateral positions on the lower portion.

17. The vehicle roof track system of claim 15, wherein each bracket has an adjustable vertical height.

18. A vehicle, comprising:

a roof structure;

a safety bar assembly inside the vehicle; and two tracks mounted on the roof structure, each track supported by a pair of brackets inside the vehicle;

wherein each bracket includes a roof rail fastened to one of the two tracks through the roof structure, and a bar foot engaging the safety bar assembly; and wherein a rear bracket of each pair of brackets includes a support member, the roof rail and the bar foot of the rear bracket each being pivotably connected to the support member.

19. The vehicle of claim 18, wherein the support member of each rear bracket is connected to the roof rail and the bar foot of the rear bracket by a ball and socket joint.

20. The vehicle of claim 18, wherein each bracket has an adjustable lateral width, and an adjustable vertical height.

\* \* \* \* \*